(12) United States Patent  
Nii

(10) Patent No.: US 7,463,738 B2
(45) Date of Patent: Dec. 9, 2008

(54) METHOD FOR PROVIDING MULTIMEDIA FILES AND TERMINAL THEREFOR

(75) Inventor: Naoaki Nii, Higashikurume (JP)

(73) Assignee: Nokia Corporation, Espoo (FI)

( * ) Notice: Subject to any disclaimer, the term of this patent is extended or adjusted under 35 U.S.C. 154(b) by 811 days.

(21) Appl. No.: 09/739,797

(22) Filed: Dec. 20, 2000

(65) Prior Publication Data

US 2002/0076051 A1   Jun. 20, 2002

(51) Int. Cl.
*H04N 7/167* (2006.01)
*H04L 9/00* (2006.01)

(52) U.S. Cl. ........................................ 380/232; 705/65

(58) Field of Classification Search ................. 380/232
See application file for complete search history.

(56) References Cited

U.S. PATENT DOCUMENTS

| | | | |
|---|---|---|---|
| 4,528,643 A | | 7/1985 | Freeny, Jr. |
| 5,629,980 A | * | 5/1997 | Stefik et al. ................ 705/54 |
| 5,721,778 A | * | 2/1998 | Kubota et al. ............. 380/212 |
| 5,734,719 A | | 3/1998 | Tsevdos et al. |
| 5,758,257 A | | 5/1998 | Herz et al. |
| 5,857,175 A | | 1/1999 | Day et al. |
| 5,910,987 A | * | 6/1999 | Ginter et al. ................ 705/52 |
| 5,963,916 A | | 10/1999 | Kaplan |
| 6,032,130 A | | 2/2000 | Alloul et al. |
| 6,055,314 A | * | 4/2000 | Spies et al. ................ 380/228 |
| 6,189,099 B1 | * | 2/2001 | Rallis et al. ............... 713/172 |
| 6,449,651 B1 | * | 9/2002 | Dorfman et al. ........... 709/229 |
| 6,560,581 B1 | * | 5/2003 | Fox et al. .................. 705/51 |
| 6,895,393 B1 | * | 5/2005 | Numata et al. ............. 705/52 |

FOREIGN PATENT DOCUMENTS

| | | |
|---|---|---|
| CA | 2319773 | 1/1999 |
| FR | 2 774 187 | 7/1999 |
| WO | WO 00/20950 | 4/2000 |
| WO | WO 0020950 A1 * | 4/2000 |
| WO | WO 00/30117 | 5/2000 |

* cited by examiner

*Primary Examiner*—Nasser Moazzami
*Assistant Examiner*—Brandon S Hoffman
(74) *Attorney, Agent, or Firm*—Banner & Witcoff, Ltd.

(57) ABSTRACT

A method of and a system for securely distributing data files to a user. A first key is encrypted using a second key. The encrypted first key is stored on an integrated circuit card that is associated with the user. The integrated circuit card is provided to the user. Data files are encrypted using the first key to get an encrypted data file at a first party. The encryption parameters are exchanged between the first party and integrated circuit card.

35 Claims, 20 Drawing Sheets

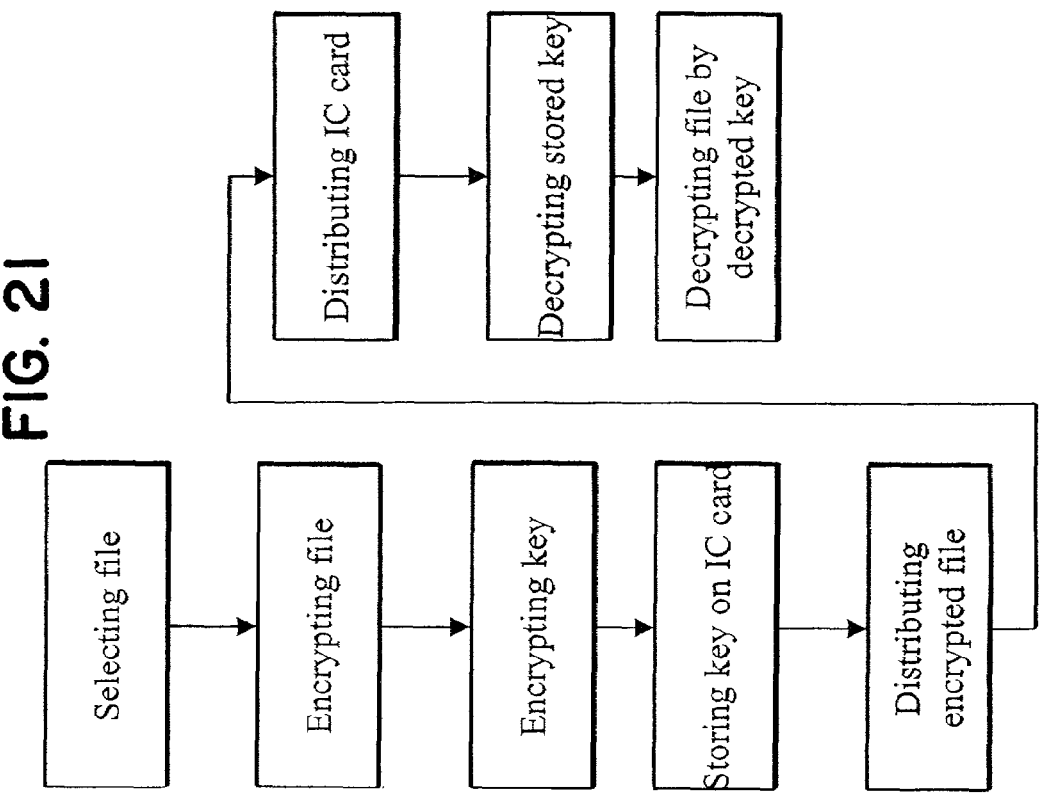
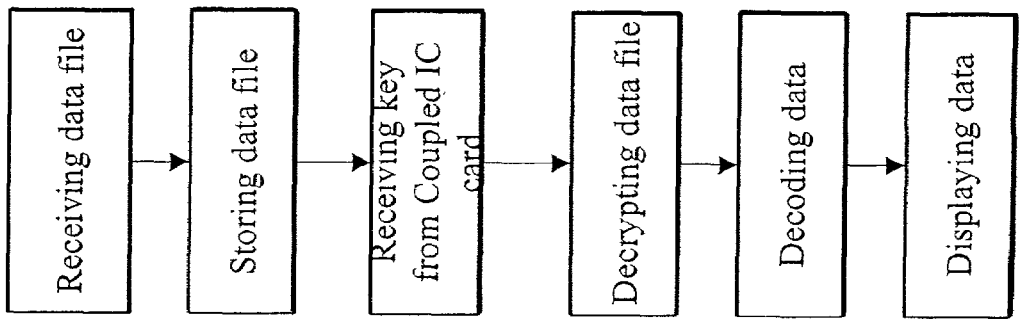

METHOD FOR PROVIDING MULTIMEDIA FILES AND TERMINAL THEREFOR

BACKGROUND OF THE INVENTION

1. Field of the Invention

The present invention relates to a system for and method of providing secure data. The present invention is particularly suited for, though not restricted to, providing secure data over a wireless transmission system.

2. Description of the Related Art

The automatic distribution of multimedia content is becoming widely available. By way of example, publicly available terminals or kiosks are often provided in such locations as shopping malls and convenience stores to enable people to access audio or video material without the need for a sales representative. A person wishing to obtain such media can select from available media and receive the selected media in various forms, for example by means of loud speakers or headphones or by means of a video screen or by downloading the media in electronic form. The person obtaining the media might be doing so simply for one time information or entertainment value. Alternatively, the person might desire to retain a magnetic copy of the media, permitting the person to have repeated access to the media.

In some applications, the media might be made available to the person desiring it at no charge. For example, a store selling musical compact disks might have kiosks at which selections from available compact disks can be sampled. Such a store might wish to limit the number of selections that any one customer can sample so as to prevent people from simply listening to numerous samples with no interest in purchasing any. A method must be provided to limit the number of samples which the customer can access. Alternatively, such a store might have kiosks at which for an appropriate charge the complete contents of a compact disk can be downloaded for duplication. In such event, a method must be provided to assure that an appropriate charge is paid.

In other situations, multimedia content might be made available to persons authorized to receive such content, but must be inaccessible by others. For example, kiosks might be provided at which persons who are traveling can obtain access to e-mail that is intended for them, even though they do not have their own computer or other terminal device with them. Even if a person has a notebook computer or other terminal device accessible, the person may not have e-mail access from that device. In such cases, a secure manner must be provided to assure that e-mail can be accessed only by the correct recipient, and is not accessible by others. Similarly, multimedia content intended only for persons above a particular age might be accessible, but persons not authorized for receipt of such multimedia must not be able to access it. For example, a kiosk might be equipped to permit users to play video games, but some of the games might have content that makes it desirable to restrict access to those games to persons of at least some minimum age, such as 18, while permitting access to others of the games by all persons regardless of age.

A computer network might be accessed by a user who types in an identification and a password. After accessing the network, the user then must type in the identification of files that he or she desires to access. All of this requires a user terminal equipped with appropriate input devices, such as a keyboard and/or a mouse, and requires manual typing or other selection by the user. An undesirable amount of time is required for such a procedure, particularly if the user makes an error in the typing or other selection. In addition, significant bandwidth is required for the communication link between the user and the desired file.

Public key systems are used as signatures and for security. An entity called a certification authority (CA) performs two central functions: issuance and revocation of certificates, and secure delivery. A certificate is used as a secure way of delivering data. The certificate is signed by the CA. To verify the certificate, an authentic copy of the CA's public signature verification key is required. For example, if a person or entity has the public key of a particular CA (CA1), this person or entity can verify certificates issued by another particular CA (CA2) only if CA2's public key has been certified by CA1. This type of cross-certification of CAs is referred to as a "public key infrastructure" (PKI).

Integrated Circuit (IC) cards or electronic chip cards such as smart cards are usually the size of a conventional credit card and have six or eight electrical contacts on one face. Such smart cards contain an IC with a memory and perhaps a microprocessor. Data and programs for manipulating the data and communicating outside the card are included in the IC. In the past these cards, like prepaid cards, have been widely used in the purchase of telephone service, particularly in France and Germany, where public pay telephones accept the prepaid cards instead of coins. Typically the prepaid cards are purchased at a post office for a specific amount. The cards are inserted in a public pay telephone, connection is made to the contacts, and units of value are removed from the card as the telephone call progresses. The mechanical and electrical specifications of the cards are standardized, and one set of standards is published by the ANSI (American National Standards Institute), 11 West 42 Street, New York, N.Y. 10036 under the title "Identification cards-IC(s) cards and contacts" ISO 7816-1 and ISO 7816-2. IC cards have been manufactured and are commercially available from several companies including, for example, GEMPLUS Card International, Avenue du Pic de Bertagne, Parc d'activities de la Plane de Jougues, 13420 Gemenos, France. Once the value on the prepaid card has been consumed, for example, all of the units or value of the card have been used conventionally in telephone calls, the user has to buy another card or to refill the empty card to continue with the service.

The following summarizes some of the prior art systems for providing multimedia content to users:

Published International Patent Application No. WO 00/30117, the disclosure of which is incorporated herein by reference, shows a system for downloading music from a publically available terminal or kiosk to a self-contained personal music device for subsequent playback, with the kiosk being activated in response to insertion of a credit card or cash.

U.S. Pat. No. 5,734,719, the disclosure of which is also incorporated herein by reference, discloses a system for providing access at a retail site to a remote database to create a compact disk or a magnetic tape of a desired media, such as an audio or a video selection.

U.S. Pat. No. 5,963,916, the disclosure of which is also incorporated herein by reference, shows a similar system, with the user or customer being issued an IC card which the customer uses to activate a kiosk from which the media is accessible.

U.S. Pat. No. 6,055,314, the disclosure of which is also incorporated herein by reference, concerns a system in which a customer is issued a smart card that includes a decryption key, allowing the customer to download a video selection that is associated with the particular decryption key.

U.S. Pat. No. 6,032,130, the disclosure of which is also incorporated herein by reference, discloses a kiosk which can be activated by a credit card to allow copying of media.

U.S. Pat. No. 5,758,257, the disclosure of which is also incorporated herein by reference, shows a system for making media available to customers in which the system captures information about each customers selections and then uses that information to build a customer profile for each customer. When a previous customer returns, the system might suggest media which the customers previous selections, as incorporated in the customer profile, indicate the customer might like.

U.S. Pat. No. 5,857,175, the disclosure of which is also incorporated herein by reference, shows customer cards, each customer card having machine readable card information indicating at least identification of the card with a particular customer account; and a customer interface in communication with a computer to transfer data therebetween. The customer cards are used as medium to store individual profiles and parameters that help the delivering entity to establish profiles and produce content.

These prior art systems not only require the customer or other user to manually input information, but also do not adequately assure access only by persons authorized for access to selected multimedia content. An open communication environment and uncertainty in privacy are becoming more general, as computers, mobile phones, and the distribution channels become more popular. As a result, parties involved in the delivery and usage process are looking for more advanced ways to assure secure delivery and controlled usage of data.

SUMMARY OF THE INVENTION

The present invention overcomes these limitations in the prior art, as well as other limitations, as will become apparent upon reading and understanding the present specification. The present invention provides a system, an apparatus and a method for securely distributing at least one data file to a user, while encrypting the data file using an encryption key having encryption parameters. In another aspect, the present invention makes it possible to securely distribute at least one data file to a user without substantial online network connectivity. In a further aspect, with the present invention it is possible to functionally monitor a securely distributed data file. In yet another aspect, the present invention makes it possible to authenticate users on-site. In a still further aspect, the present invention makes it possible to effectively provide billing for the securely distributed data files. In still another aspect, the present invention makes it possible to include a distribution label on a securely distributed data file. In yet another aspect, the present invention makes it possible to control the access to the distributor in a multidistributor environment.

In accordance with one aspect of the invention, there is provided a new and improved method for secure distribution of multimedia files. The method for securely distributing at least one file to a user includes the steps of encrypting a first key using a second key, and storing the encrypted first key on an IC card of a first party. The method further includes providing the IC card to the user, and encrypting the file using the first key, to result in an encrypted file at the first party, distributing the encrypted file to a second party for delivery of the encrypted file from the second party, and providing of the IC card to the terminal associated with the user for downloading of the file from the second party.

Optionally, the encrypted data file may be distributed from the provider to a wireless terminal and stored on a medium at the wireless terminal. The IC card may be coupled to the wireless terminal, and the second key may be transferred to a memory of a terminal device. The first encrypted key may be decrypted with the second key in the wireless terminal, and the encrypted file may be decrypted using the decrypted first key in the wireless terminal if decryption is requested. The file may include a multimedia file. The first party may be the publisher of the file. The provider may be a distributor of the file. The terminal may be a wireless terminal for multimedia data.

In one embodiment, the present invention makes it possible to predefine the downloadable multimedia the user wants. The deliverer of the media need not be concernted about the IC card information; downloading is automatically done between the multimedia kiosk and a wireless terminal which have agreed earlier upon the multimedia the user wants. Thus, in this embodiment of the invention there is easy access to multimedia delivered in kiosks. Further, the delivery of the content in the kiosk environment need not be involved in the actual encrypting key handling process. The delivery of the key information is not needed in the kiosk environment. In an embodiment of the inventive method and system, real time connection between the parties is not needed, and the user need not be connected to the network when the content is transferred to his/her terminal.

In accordance with another aspect of the invention, there is provided a new and improved system for providing secure data, which includes a first party issuing a data file and a first IC card for a wireless terminal, wherein the first party is coupled with a second IC card. A second party distributes the issued data file, the second party being coupled with a third IC card. The system may include a third party for presenting the distributed data file, wherein the third party is coupled with the first IC card.

Optionally, the system may include an administrator for issuing the first and second IC cards. The system may also include a distribution channel between the first and the second parties. The distribution channel may also be between the second party and the wireless terminal. The first party may include a publisher of the data file. The second party may include a distributor of the data file. The second party may alternatively include a wireless kiosk. The third party may include a wireless terminal.

In accordance with a further aspect of the invention, there is provided a new and improved method for monitoring data files. The method for monitoring a securely distributed data file includes the steps of storing at least one index on an IC card and associating the index with the data file, wherein the IC card is associated with a party.

Optionally, at least one IC card is issued, and the data file is transferred between the issuing party and a second party, wherein the transferred data file may corresponds with the index stored on the IC card of the second party. The data file is transmitted from a distribution party to the user, received at the user, and stored on a terminal of the user if either the indication of the received data file or a source of the data file correspond with the index stored on the IC card of the user. The IC card, including an identity of a source to the associated party is also be distributed. The IC card is coupled to a wireless terminal of the party. The associated index is sent to a source of the data file. The sent index is checked for correspondence with an index stored on the IC card of the source. The delivery includes storing the delivered data file on a medium at the wireless terminal. An index stored on a computer communicating with a wireless terminal of the IC card is synchronized with the index of the IC card. The data file is downloaded to a wireless terminal and acknowledged. The acknowledged data file is stored on the IC card of a distributor. The downloaded data file is accessed if an index of the data file corresponds with the associated index of the IC card. A wireless link is established between terminals and verified if the indication of a recipient terminal includes a publisher which is included in the index of a sender terminal. The data file is transferred if the index of the recipient terminal includes the publisher included in the index of the sender terminal. The index may include, for example, a usage meter of the data file, a certain price for the data file, and a certain geographic area in which the data file is to be distributed.

In accordance with yet further aspect of the invention, there is provided a new and improved wireless terminal for obtaining secure data. The wireless terminal is capable of receiving secure data in a communication network. The terminal includes a wireless module for receiving the secure data from a data source and an IC card interface for coupling an IC card to the wireless terminal, the IC card having a first key. The terminal includes a storage device connected to the wireless module for storing the received data, a secure module including a second key connected to the IC card interface and the storage device for obtaining the first key from the coupled IC card and decrypting the received secure data in response to a request, and an output device connected to the secure module for presenting the decrypted data.

Optionally, the wireless module may include an antenna and a transceiver. The secure module may include a decryption module, for obtaining the first key and decrypting the first key and the secure data, and a decoding module.

In accordance with a still further aspect of the invention, there is provided a new and improved storage object. An IC card is provided for storing an encrypted key for decryption of an encrypted data file, the IC card including an interface for coupling the IC card to a wireless terminal, a storage device for storing the encrypted key for the decryption of the encrypted data file and for storing at least one index, and a processor configured to process data between the interface and the memory.

Optionally, the index may authenticate the terminal to generate a new index. The index may include the identity of the wireless terminal, an identity of a user, the identity of the data file, or a user profile. The index may control access to the data file. The index may include a usage meter for the data file or an operation meter for the wireless terminal. The storage device may include a data memory.

In accordance with a yet further aspect of the invention, there is provided a new and improved method for billing for securely distributed data files, including the steps of encrypting a first key using a second key, and storing the encrypted first key on an IC card at a first party. The method further includes providing the IC card to the user, and encrypting at least one data file, using the first key, to result in an encrypted data file at the first party, distributing the encrypted data file to a second party for delivering the encrypted data file from the second party, delivering the IC card to a terminal associated with the user for downloading the data file from the second party, and updating a value of delivery parameters of the parties.

Optionally, the delivery parameters may include a specific multimedia file, a group of multimedia files, a category of multimedia files, a maximum number of multimedia files, or a maximum value of multimedia files. At least one party may be billed according to the delivery parameters. A distribution label may be connected to the securely distributed data file for visual identification of a desired effect.

In accordance with still another aspect of the invention, there is provided a new and improved method for controlling access to a distributor in a multi-distributor environment, including the steps of encrypting a first key using a second key, storing the encrypted first key on an IC card at a first party, providing the IC card to a user, and encrypting at least one data file using the first key to result in an encrypted data file at the first party. The method further includes distributing the encrypted file to a second party for delivery of the encrypted data file from the second party, delivering the IC card to a terminal associated with the user for downloading the data file from the second party, wherein the validity of the IC card is checked at the second party, and dividing rights between parties to enable the user to access to the data files of different first parties.

For a better understanding of the present invention, together with other and further objects thereof, reference is made to the following description, taken in conjunction with the accompanying drawings.

BRIEF DESCRIPTION OF THE DRAWINGS

The method, system, terminal and card according to the invention will be described in more detail by means of preferred embodiments, with reference to the appended drawings in which:

FIG. 20 is a flow chart of a method of receiving and displaying data in accordance with an embodiment of the present invention.

FIG. 21 is a flow chart of a method of selecting, distributing, and decrypting a file in accordance with an embodiment of the present invention.

DETAILED DESCRIPTION OF THE EMBODIMENTS

Figure 1:
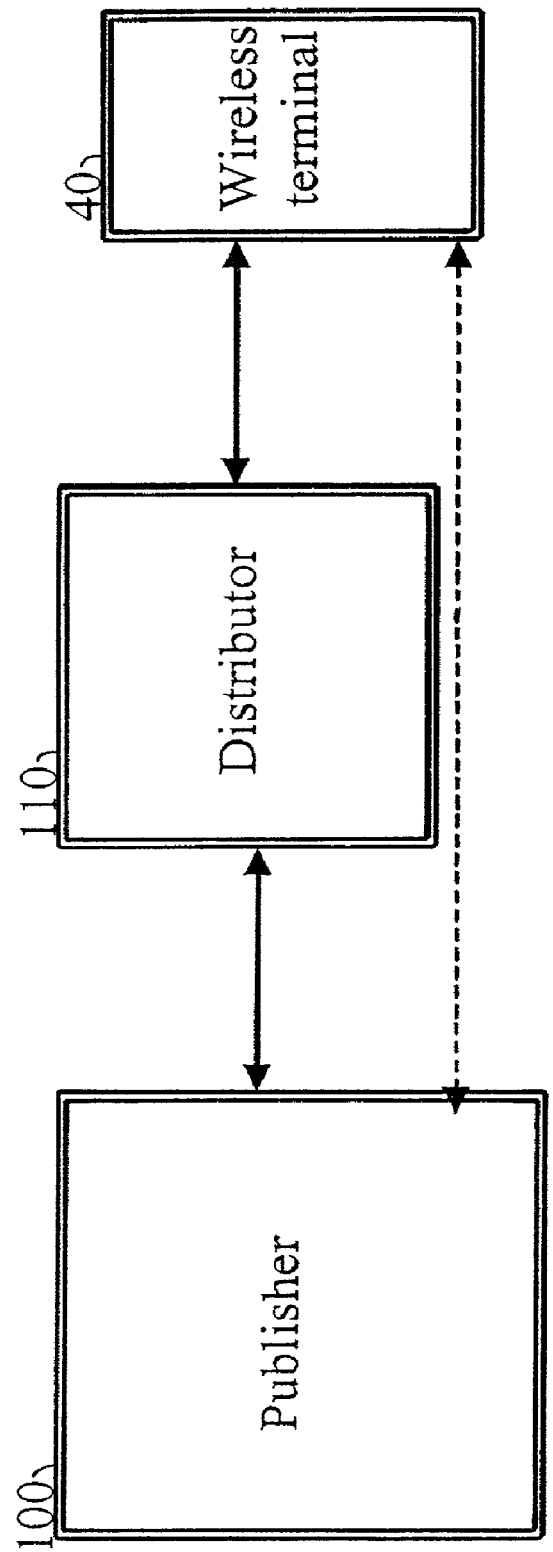
FIG. 1 depicts an exemplary embodiment of a networking environment in which the principles of the present invention may be applied.

In FIG. 1, an exemplary embodiment of a networking environment in which the principles of the present invention may be applied is illustrated. A first party such as a publisher 100 encrypts a data file in a secure environment. Publisher 100 is a computer server connected to a second party such as a distributor 110. The secure environment of publisher 100 may be implemented on the Internet using firewalls. It may also be implemented by a separate Local Area Network (LAN) having no access from outside the LAN, or it may also be a separate system having no access outside the system. The data file may be any type of computer readable file, for example a multimedia file. Publisher 100 may encrypt the data file with an algorithm. Publisher 100 may also provide keys that are capable of eventually decrypting an encrypted file. The encryption process may be under a secure environment of publisher 100.

Distributor 110 receives the encrypted file via a communication link, such as any one of various distribution channels. Distributor 110 may be a specific terminal. Distributor 110 may distribute the encrypted file to a third party. The third party may be a terminal such as a wireless terminal 40 to which the file is distributed via a communication link, such as any one of various distribution channels. Wireless terminal 40 receives the distributed encrypted file and stores the received encrypted file. Publisher 100 may also provide secure parameters directly to wireless terminal 40. The system provides the data file in a secure manner to the user of wireless terminal 40 via various environments.

The distribution channel may be any type of channel allowing data files to be transferred. The distribution channel may include, but is not restricted to, any general-computer readable medium that is capable of storing encrypted files, for example theater films, videocassettes, Compact Disks (CD), Digital Video Disks (DVD). The distribution channel may include, but is not restricted to, any type of network that is capable of transferring encrypted files, for example TV cables, one way networks such as broadcasting networks, Digital Video Broadcasting (DVB), Digital Audio Broadcasting (DAB), online networks, two-way networks such as the Internet, mobile networks, and short range radio communication such as Bluetooth. The distribution channel may also be any combination of these, for example, a DVD then reading the disk and further transmission via DVB. A mobile network used as a distribution channel may be any type of mobile communication network, including, but not restricted to, GSM (Global Standard for Mobile/Groupe Speciale Mobile), GPRS (General Packet Radio System), UMTS (Universal Mobile Telephone System) or 3G (Third generation of mobile communications), where 3G can be compatible with GSM, HSCSD (High Speed Circuit Switched Data), GPRS, EDGE (Enhanced Data Rates for Global/GSM Evolution) and WCDMA (Wideband Code Division Multiple Access). Various other mobile networks can also be supported in 3G, such as CDMA (Code Division Multiple Access), PDC (Personal Digital Communications), CDMA2000. The mobile network may also be WLAN (Wireless Local Area Network).

Figure 2:
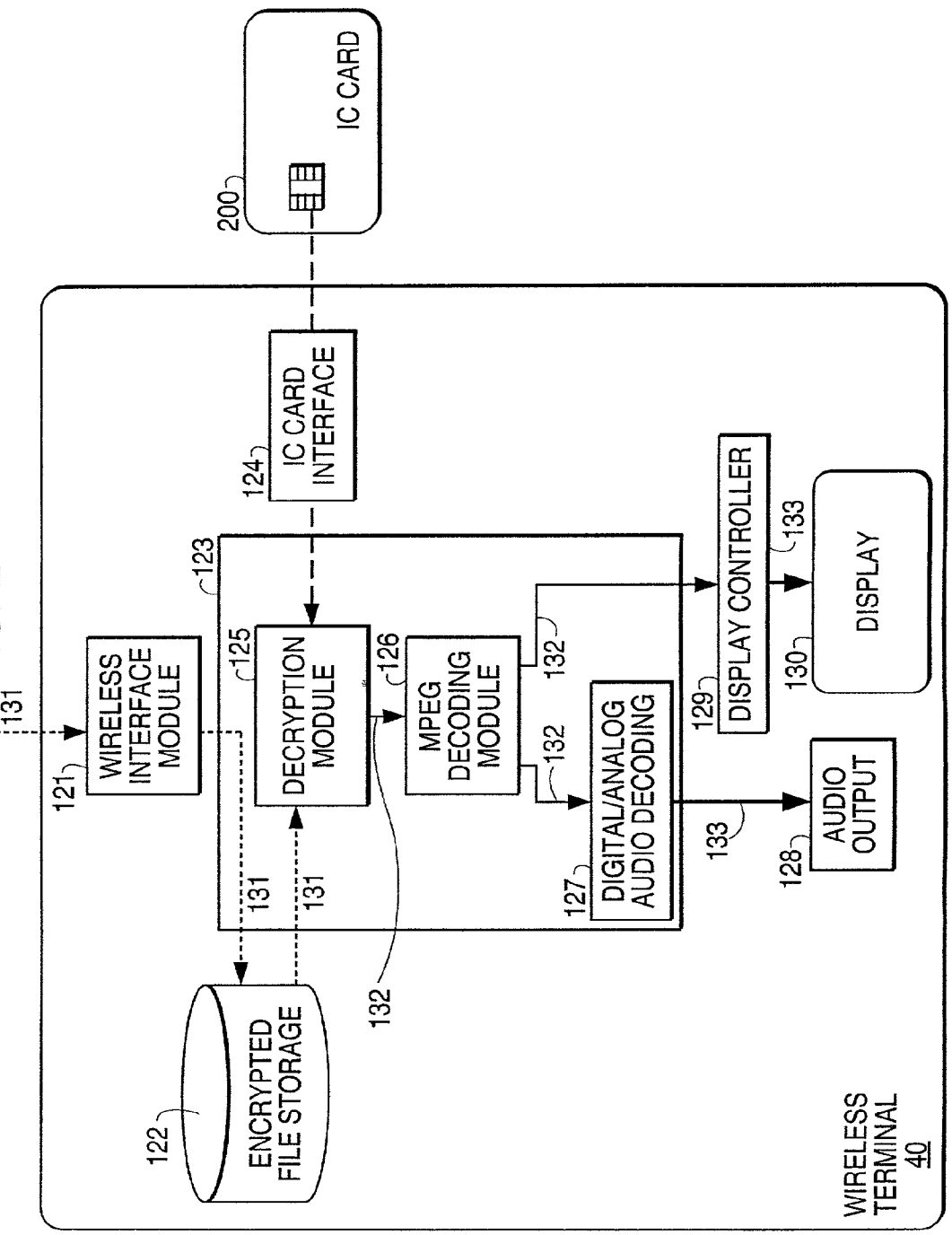
FIG. 2 depicts a block diagram of an embodiment of a wireless terminal, showing terminal components in accordance with an embodiment of the invention.

In FIG. 2, a block diagram of an exemplary wireless terminal is illustrated. Wireless terminal 40 includes a wireless interface module 121 for receiving an encrypted file in an encrypted data flow 131. The wireless interface module 121 includes a receiver and an antenna and possible also a transceiver. Wireless interface module 121 may be capable of, for example, mobile or short-range radio communication. Wireless terminal 40 includes an encrypted file storage device 122 connected to wireless interface module 121 for storing the received file in the encrypted data flow 131. Wireless terminal 40 also includes a secure module 123 that may, for example, be a hardware tamper resistant module (HTMR). Secure module 123 is connected to encrypted file storage 122 and to a user IC card interface 124. Secure module 123 stores a second key and receives the file in the encrypted data flow 131 and a first key for the decryption when an execution of the file is needed. A decryption module 125, included in secure module 123, performs the decryption of the first key, using the second key, and the decryption of the file using the first key in response to a request. User IC card interface 124 is adapted to receive an IC card 200, such as a smart card, with wireless terminal 40, allowing a first key to be transferred from the card to the terminal, possibly in response to a request. Secure module 123 includes Motion Picture Experts Group (MPEG) decoding module 126, which receives the decrypted data in decrypted data flow 132 from decryption module 125, for generating video data from the decrypted data. Secure module 123 also includes a digital/analog audio decoding device 127 for converting decrypted data flow 132 to an analog signal 133. Wireless terminal 40 has an audio output device 128 for receiving analog signals 133 from digital/analog audio decoding device 127, and a display controller 129 to convert the decrypted data 132 to analog signals 133 for application to a display device 130. Wireless terminal 40 may also be used as a terminal for distribution by a distributor 110.

The IC card which may be purchased in advance and which is inserted into the terminal may be active immediately after it has been purchased. The activity of the card may be allowed for only a specified period of time. Thus, the activity depends on the time limits given to the card.

Figure 3:
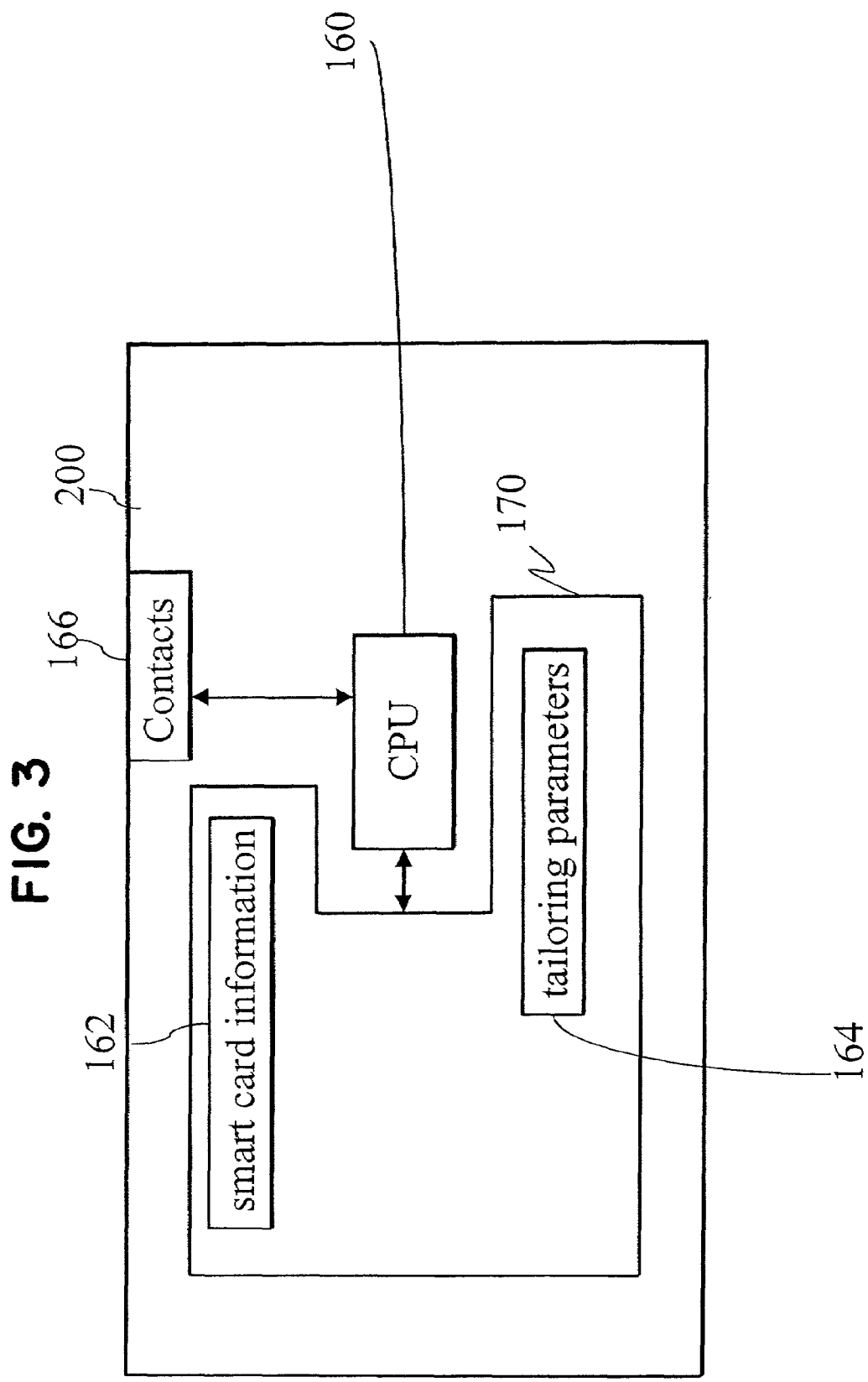
FIG. 3 depicts an embodiment of an IC card in accordance with an embodiment of the present invention.

FIG. 3 depicts an embodiment of an IC card 200. IC card 200 includes a central processing unit (CPU) 160, an IC card Identification code such as a serial number 162, tailoring parameters 164 and contacts 166 for enabling mechanical and electrical contact to wireless IC card interface 124 of terminal 40. Alternatively, IC card 200 may be a contactless card. Tailoring parameters 164, including a card identification, are stored in IC card memory 170. The card validity might be based on a fee paid periodically such as monthly or annually. After the paid amount is received, the corresponding entry is made in a validity register.

The microprocessor and the several registers of IC card 200 may be all contained within a single chip. The information need not be allocated to a unique space within the IC card memory. For example, the various numbers in the registers may be moved around under the control of the microprocessor in accordance with the design of the particular IC card chip.

The serial number of the IC card and possible other functions, such as time and date of validity, may be written into the IC at the time of manufacture, or subsequent to manufacture. Any convenient or conventional type of circuit and method for the entry of such data may be used.

Some embodiments of the invention use short-range communication such as Bluetooth communication in, for example, transferring of data files. The first Bluetooth device takes the initiative and regularly performs inquiries to detect surrounding Bluetooth terminal devices. During the first phase of the process, the first Bluetooth device and the other Bluetooth device form a first Bluetooth connection, establishing a piconet. In forming a piconet, inquiries are executed for establishing a connection, and after successful completion of inquiries, paging is activated. After paging the Service Discovery Protocol (SDP) channel is opened, and the SDP session starts. All necessary information for establishing a Bluetooth connection is gathered, including but not limited to, for example, the other Bluetooth device's baseband address and clock offset information from the inquiry mode, the Bluetooth class of the other Bluetooth device, and supported services information of the devices from the SDP mode. After the information is gathered, a non-SDP natural channel can be opened for Bluetooth communication between the devices. Available channels in the Bluetooth protocol architecture are illustrated and can be found more thoroughly in "Specification of the Bluetooth System," available on the Internet at http://www.bluetooth.com. When the communication between the Bluetooth devices is to be concluded, the first Bluetooth device, or the second Bluetooth device, sends a Link Manager Protocol (LMP) detach message that terminates the session between the devices.

Four substantially different parties are involved. An administrator administers the process for the benefit of publisher 100, distributor 110, and a consumer or a user of wireless terminal 40. Publisher 100, publishes the digital content or data file and issues the user an IC card in order to give access to the published content. Distributor, 110, owns and operates a distribution terminal such as a wireless kiosk or any distribution point for transferring the digital content from publisher 100 to a user. A user may use wireless terminal 40, for example, a wireless multimedia terminal, for access so as to receive digital content and utilize it. There might be other parties who fill in the relation or interaction among the above four parties, for example a network service provider between publisher 100 and distributor 110. However, these are irrelevant to the unique features of the invention.

Figure 4:
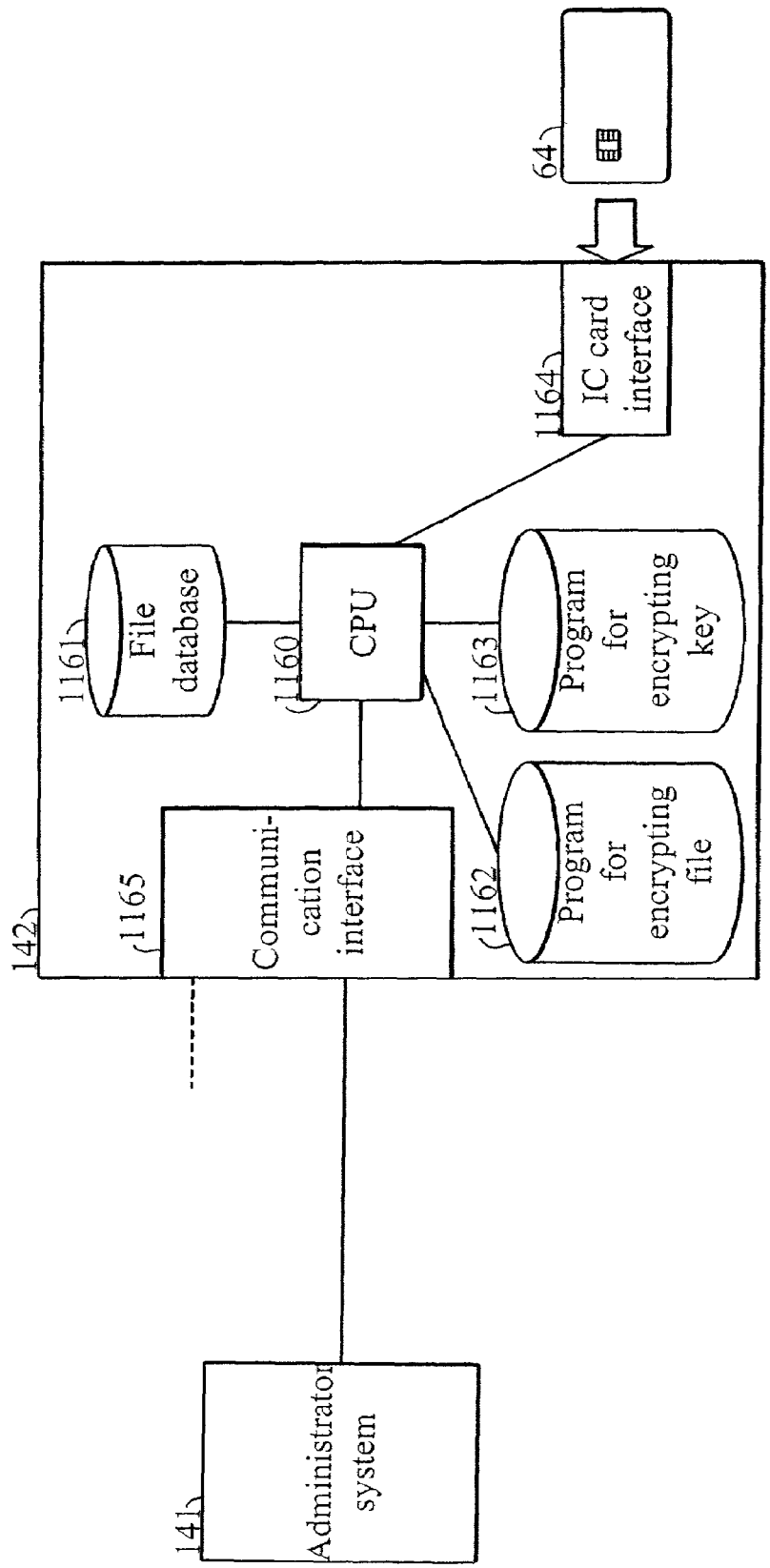
FIG. 4 is a block diagram of publishing system in accordance with an embodiment of the present invention.

FIG. 4 is a block diagram of a publishing system in accordance with an embodiment of the invention. Publisher 100 includes a publishing system 142 for issuing data files and a user IC card 64. Within publishing system 142, a CPU 1160 is connected to a file database 1161 including data files and possibly encrypted data files. A program memory 1162 stores a program for encrypting files and is connected to CPU 1160, enabling encryption of data files that are issued by publishing system 142. A program memory 1163 stores a program for encrypting keys and is connected to CPU 1160, enabling encryption of a key for file decryption which may be stored on user IC card 64. An IC card interface 1164 is connected to CPU 1160 and is capable of coupling an IC card 64, for example an IC card for the publisher, to publishing system 142. User IC card 64 is also coupled to the interface 1164 to enable issuing the card. Publishing system 142 may also include more than one IC card interface, or publishing system 142 may not include any IC card interface at all. A communication interface 1165 is connected to CPU 1160, enabling publishing system 142 to communicate with distribution terminals via a distribution channel. Communication interface 1165 provides a connection to a separate medium such as a disk, enabling publishing system 142 to transfer data files between the medium and publishing system 142. An administrator system 141 is connected to publishing system 142 via a communication link such as the distribution channel. Administrator system 141 includes a substantially similar system as publishing system 142, serving the purpose of administrator 140 as described herein.

Figure 5:
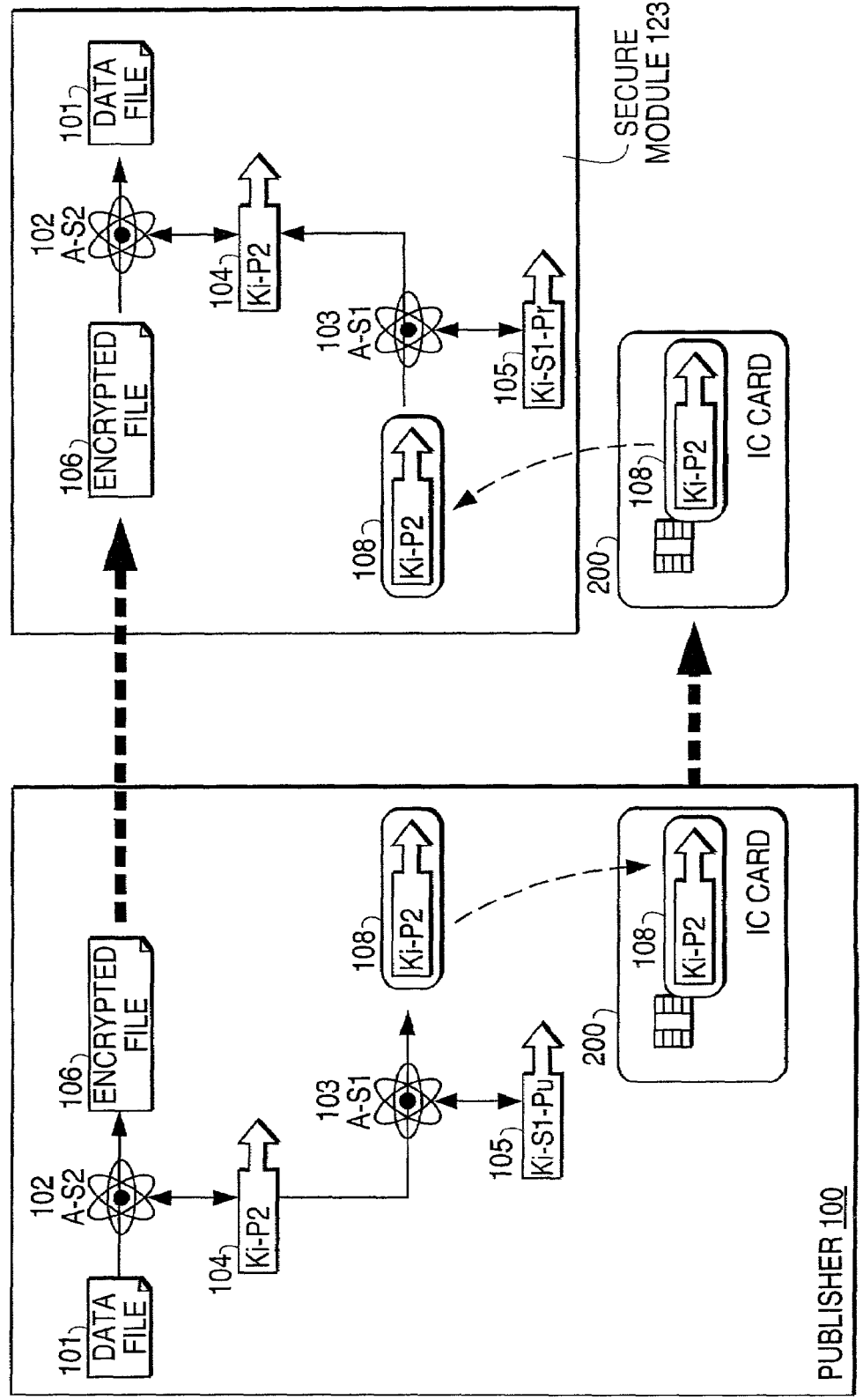
FIG. 5 depicts an embodiment of a distribution system for secure data and keys between parties in accordance with the present invention.

FIG. 5 illustrates the distribution of secure data and keys between parties, where a wireless terminal may eventually provide decrypted data. Encryption parameters include an encryption algorithm and a key to the algorithm. Decryption keys 104, 105 for encrypted file 106 are programmed into IC card 200 with encryption in a secure environment. Public key infrastructure (PKI) is used for secure distribution of the decryption key. An administrator provides a public key 105 for the data file publisher 100. If the data file publisher 100 uses a symmetric key for data file encryption, publisher 100 encrypts the symmetric key using a public key 105 which is provided by the administrator. The administrator also provides a private key 107 to the manufacturers of wireless terminal 40. Data file 101 is encrypted using an algorithm for file encryption that may be algorithm (A-S2) 102. A key for file encryption/decryption is also provided, and that may be key (Ki-P2) 104. Key 104 is encrypted using an algorithm for key exchange encryption, that is algorithm (A-S1) 103 primarily operating between secure module 123 of wireless terminal 40 and IC card 200, which carries such key. For key exchange encryption, asymmetric keys may be utilized. The administrator generates a pair of the public key (Ki-S1-Pu) 105 and the private key (Ki-S1-Pr) 107. Publisher 100, which may have a license agreement with the administrator, receives the public key (Ki-S1-Pu) 105 in a secure manner. The manufacturer of secure module 123, who may have a license agreement with the administrator, receives the private key (Ki-S1-Pr) 107. Publisher 100 and the manufacturer of secure module 123 may only know one of the pair respectively. Under a license agreement with the administrator 140, the publisher 100 may have algorithms A-S1 103 and A-S2 102, and one public key 105. Under license, the publisher 100 may generate an encrypted key (Ki-P2) 108 with algorithm (A-S1) 103. The manufacturer of secure module 123 incorporates two algorithms (A-S1) 103 and (A-S2) 102, and private key (Ki-S1-Pr) 107 into secure module 123. Publisher 100 encrypts data file 101 to be distributed using algorithm (A-S2) 102 and key (Ki-P2) 104, which it may have issued. Data file 101 may now be encrypted. Then, publisher 100 encrypts key (Ki-P2) 104 which may be needed for decryption of encrypted file 106, using algorithm (A-S1) 103 and public key (Ki-S1-Pu) 105. The key 105 is issued by the administrator. Now the data file decryption key Ki-P2 104 is encrypted as the key 108. The publisher programs the encrypted data file decryption key (Ki-P2) 108 into IC card 200 and distributes the card. The user, who has wireless terminal 40, retrieves encrypted file 106 over the wireless interface 121. The user also obtains IC card 200, which has been issued by publisher 100, the card containing the decryption key 108. The user inserts the card into wireless terminal 40. Secure module 123 of wireless terminal 40 reads the encrypted key (Ki-P2) 108 for file decryption and decrypts the key (Ki-P2) 108 using the Algorithm (A-S1) 103 and the preinstalled private key (Ki-S1-Pr) 107. The data file decryption key 104 is decrypted and securely transferred from publisher 100 to secure module 123 of wireless terminal 40. Then secure module 123 decrypts the encrypted file 106 using algorithm (A-S2) 102 and the decryption key (Ki-P2) 104, which has been issued by publisher 100. Finally the data file 101, for example a multimedia file, is securely transferred from the data file publisher 100 to the wireless terminal 40 for access by the user.

Figure 6:
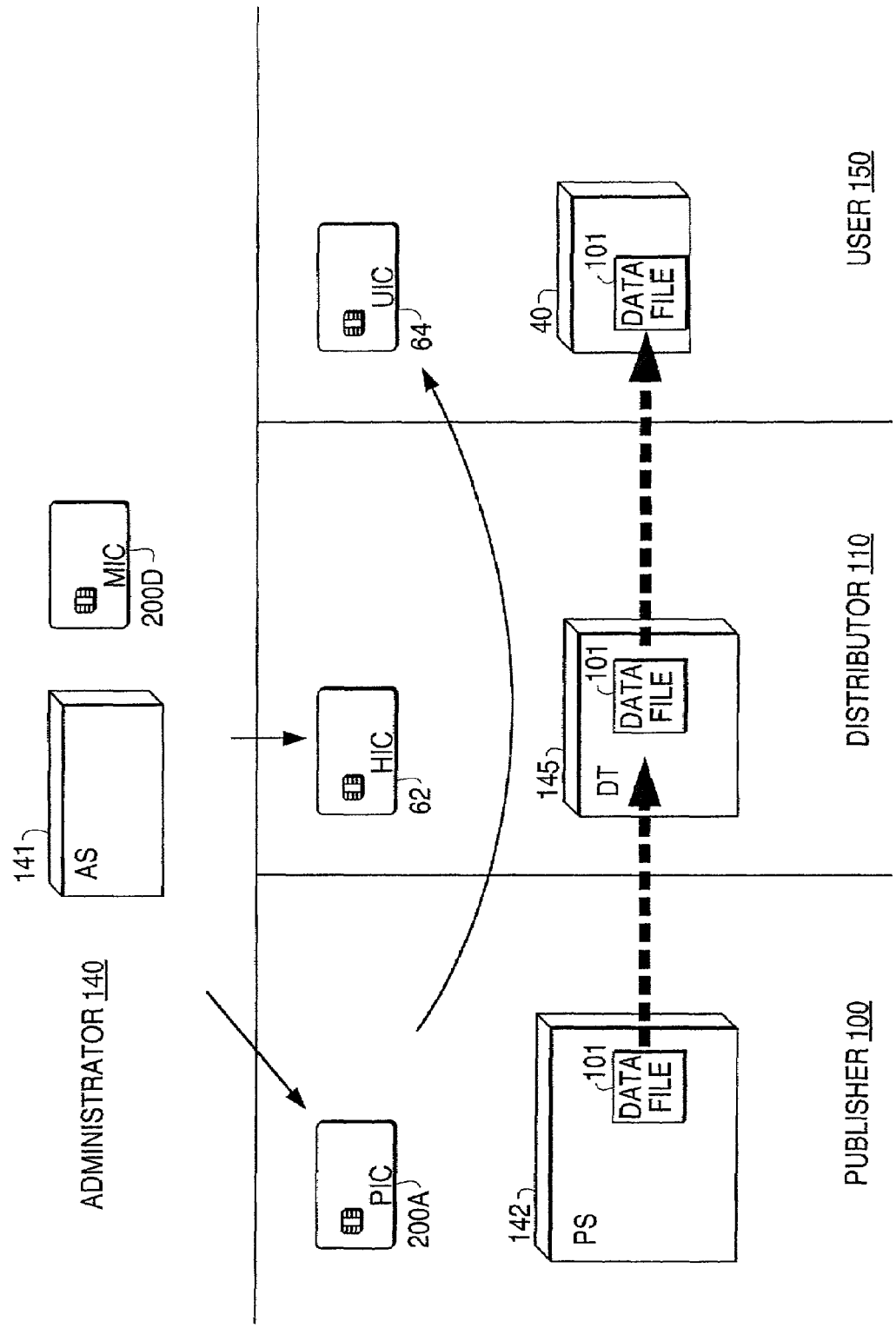
FIG. 6 illustrates a method of issuing IC cards and distribution of digital goods to consumers in accordance with an embodiment of the present invention.

FIG. 6 illustrates the issuing of IC cards and the distribution of digital goods to a consumer. Administrator 140 includes and manages administrator system 141, for example a computer server, and a master IC card (MIC) 200D. Publisher 100 includes and manages publishing system 142, for example a computer server, and the publisher IC card (PIC) 200A. The publisher IC card (PIC) 200A is issued by administrator 140 for publisher 100 which has a license. The publisher IC card (PIC) 200A is inserted into publishing system 142 to issue user IC card (UIC) 64 and data files. Distributor 110 includes and manages distribution terminal 145, for example a wireless terminal or a wireless kiosk, and the host IC card (HIC) 62 for the distributor. The distribution terminal 145 also has a communication link to other parties. The host IC card 62 is issued by administrator 140 for a licensed distributor 110, is the operator of the distribution terminal 145. Host IC card (HIC) 62 is inserted into distribution terminal 145 to retrieve data files published by publisher 100 and then to distribute the files to users. User 150 operates wireless terminal 40 or a user terminal and the user IC card (UIC) 64. User IC card 64 is normally issued by publisher 100 under the license of administrator 140. User IC card 64 is inserted into wireless terminal 40 so that user 150 may download digital content and access the content.

Indications are included in some embodiments of the invention, for example, to identify the source of a data file 101, a user, a terminal, a data file 101, and to set a control or usage level for a file. Indications such as tailoring parameters or indexes may, for example, be software tools such as Cardlets which are stored on the IC cards. Indications may also be included in data file 101.

Figure 7:
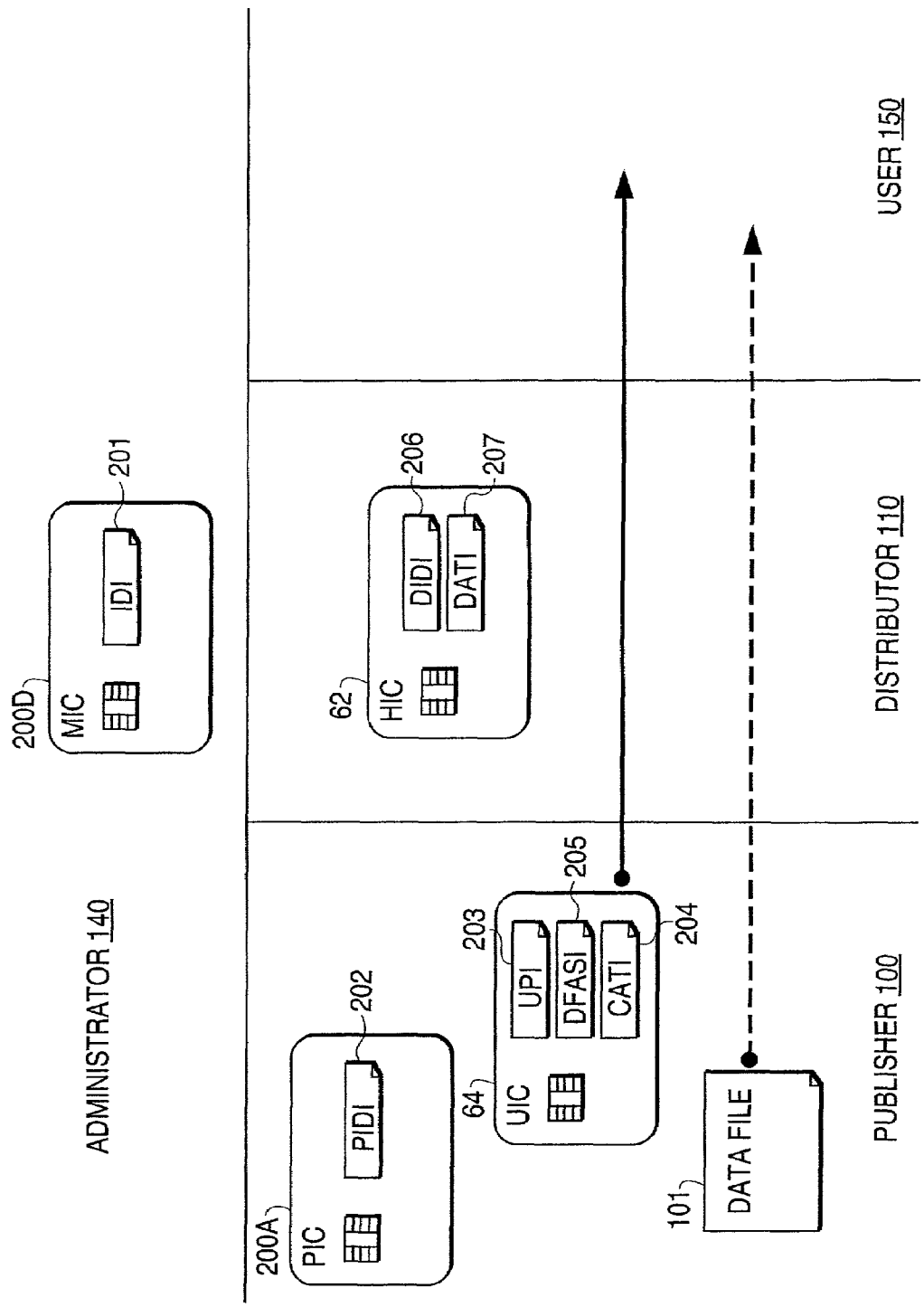
FIG. 7 illustrates an exemplary embodiment of a method for issuing indexes to IC cards and data files in accordance with the present invention.

FIG. 7 illustrates indexes to the IC card system and data files. Administrator 140 issues a master IC card 200D which includes an identity index (IDI) 201. The index (IDI) 201 is the master logical indicator such as an entity to generate other relevant entities and authenticate these logical entities. The master IC card 200D and (IDI) 201 is used for issuing publisher IC card (PIC) 200A and host IC card (HIC) 62. Publisher identity index (PIDI) 202 is issued by administrator 140 for the licensed publisher 100 to identify the publisher 100 and to provide relevant security implementation data and keys. The publisher IC card (PIC) 200A includes the index (PIDI) 202. The publisher IC card 200A and the index (PIDI) 202 are used for creating a data file 101 and data file access index (DFASI) 205. User profile index (UPI) 203 is needed for a user to access the content distribution, download and access the digital content. The administrator 140 licenses the index (UPI) 203 to publisher 100. Publisher 100 implements the index (UPI) 203 on user IC card 64 which publisher 100 issues. The index (UPI) 203 does not include publisher specific information. Consumption account index (CATI) 204 is a file including programs, keys, and data for the purpose of measuring or metering access and consumption of digital content by the user. The index (CATI) 204 is implemented by publisher 100 under certification by administrator 140. The index (CATI) 204 may be encrypted, or it may have access controlled by the IC card operating system to avoid unauthorized access. Data file access index (DFASI) 205 is issued by the publisher 100 of the data file, such as a multimedia file, under the license from administrator 140. The index (DFASI) 205 is needed by user 150 to access and utilize the relevant content, for example downloading. The index (DFASI) 205 is distributed separately from the data file which requires the index (DFASI) 205 for access. User IC card 64 includes the index (DFASI) 205.

Distributor identity index (DIDI) 206 is issued by the administrator for a licensed distributor or licensed operator of distribution terminal 145. The index (DIDI) 206 is needed to enable distribution terminal 145 to retrieve or receive a data file from the publisher and to distribute the data file to user 150 using wireless terminal 40. Relevant publisher identity is stored on the index (DIDI) 206. The host IC card 62 includes the index (DIDI) 206. Distribution account index (DATI) 207 may be a file comprising programs, keys, and data for the purpose of measuring or metering the operation of the distribution terminal 145 for the benefit of distributor 110. The host IC card 62 includes the index (DATI) 207. The index (DATI) 207 is defined by administrator 140 to support the compatibility so that more than one publisher may utilize a single distribution terminal 145. The index (DATI) 207 requires encryption or controlled access by the IC card operating system to avoid unauthorized access.

The registration of the publisher-distribution agreement into the IC card through the administrator enables non-centralized data file distribution to a distribution terminal, for example a wireless kiosk. It also enables user access control, metering of the distribution terminal usage, data file execution by the user, and metering of consumer usage.

Figure 8:
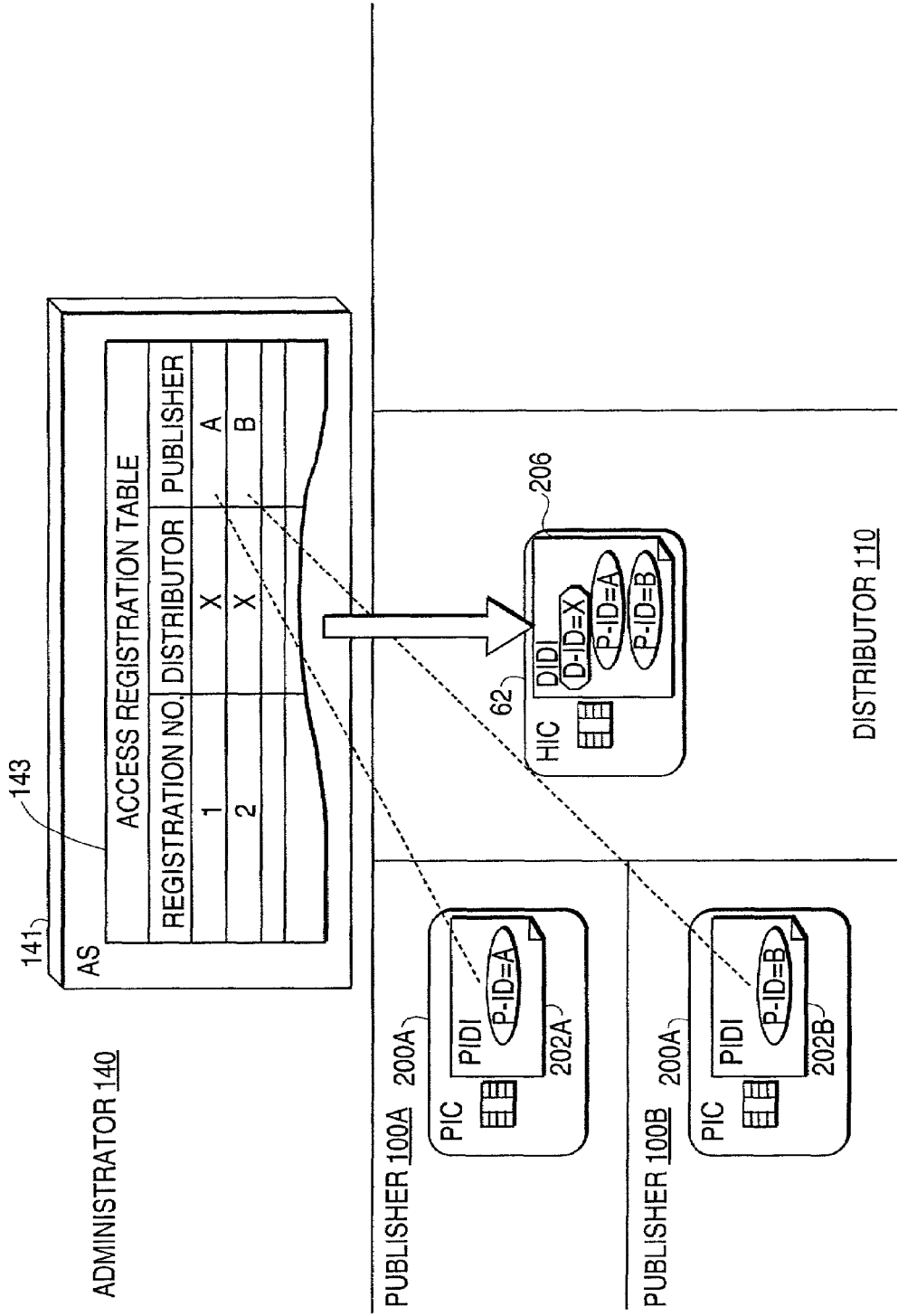
FIG. 8 illustrates an embodiment of registration of a publisher and distribution agreement in accordance with the present invention.

FIG. 8 illustrates an exemplary embodiment of registration of a publisher and distribution agreement. Administrator system 141 includes an access registration table 143 in which the index P-ID=A of a publisher 100A and the index P-ID=B of publisher 100B are registered in association with the index P-ID=A and the index P-ID=B to show that distributor 110 has agreements with publishers 100A and 100B.

Publisher 100 publishes data files 101 and issues associated index (DFASI) 205 for users. Distributor 110 receives data files from publisher 110 and stores the files in the distribution terminal 145. Distributor 110 allows access to users having a wireless terminal 40 which interfaces a user IC card 64 including relevant data file access index (DFASI) 205, and delivers the data files for such users. To achieve this distribution, publisher 100 programs the contracted distributor's identity into the relevant data files. Distributor 110 receives such distribution service charge from publisher 100 based on an agreed contract. Distributor 110 also sells user IC card 64 which is issued by publisher 100. Publisher 100 and distributor 110 register the agreement with administrator 140 at administrator system 141. Administrator 140 identifies which distributor has a data file distribution agreement with which publisher. Then, administrator 140 issues host IC card 62 which includes publisher identity (P-ID) indicating with which publisher the distributor has a distribution agreement. Another option is that administrator 140 electronically updates the existing host IC card 62. In this case there is no need to issue a new card. Distributor 110 may make agreements with multiple publishers and register these agreements with a single administrator 140 so that a single host IC card 62 can store multiple access identity information. Therefore, there is not a need to install multiple distribution terminals 145 such as multiple wireless kiosks. One distributor can deliver various data files 101 from a variety of publishers 110. As a result, many consumers may be satisfied.

Figure 9:
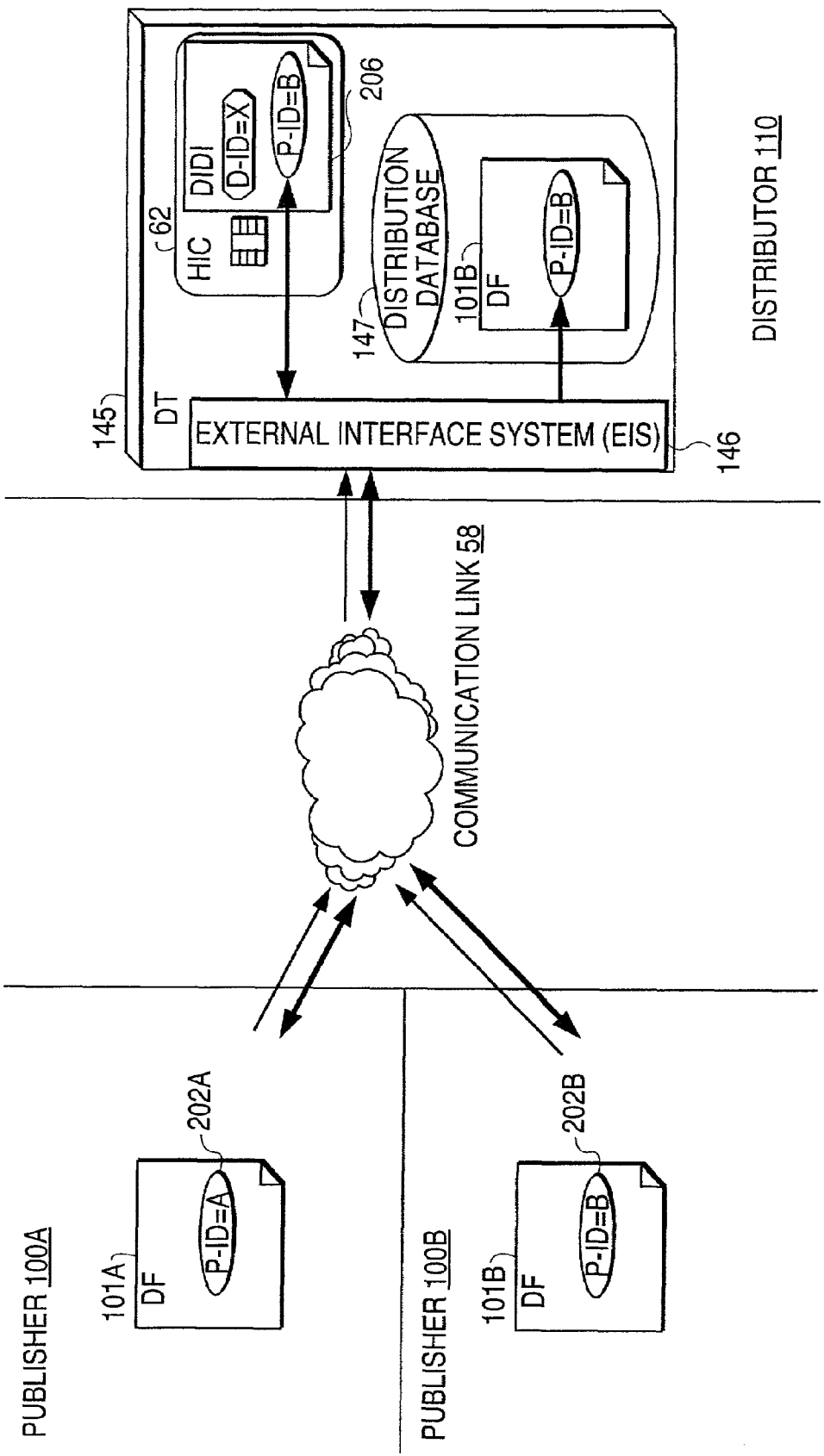
FIG. 9 depicts an embodiment of non-centralized data file distribution to a terminal in accordance with the present invention.

FIG. 9 illustrates an embodiment of non-centralized data file distribution to the distribution terminal. One of the major benefits of the invention for publisher 100 and distributor 110 is the flexibility of data transport technology from publisher 100 to distributor 110. Due to the IC card based access control method, communication link 58 places no restriction on the invention. Both one-way networking technology, for example, cable, terrestrial or satellite based digital broadcasting, CD-ROM or DVD package distribution, and two-way networking technology, for example, the Internet, virtual Intranet, or private network, may be implemented. Distribution terminal 145 comprises an external interface system (EIS) 146. The system (EIS) 146 obtains the publisher identity (P-ID) from the host IC card 62. The identity (P-ID) shows that publisher 100 and distributor 110 have a registered distribution agreement. If the data transport uses one-way networking technology, the receiving terminal receives various data file feeds from various publishers even within a single data channel. The external interface system (EIS) 146 screens data feeds and only accepts the data files having the registered identity (P-ID), and stores such data files on a distribution database 147. If the data transport uses two-way networking technology, the external interface system (EIS) 146 accesses an appropriate data server which includes the data files of the relevant publisher addressed by the registered identity (P-ID). For example, distributor 110 only may receive and store data file 101B having identity P-ID=B, which indicates publisher 100B, but not data file 101A having identity P-ID=A, which indicates publisher 100A. This is because distributor identity index (DIDI) 206 includes identity P-ID=B which is stored on host IC card 62, but not identity P-ID=A.

Figure 10:
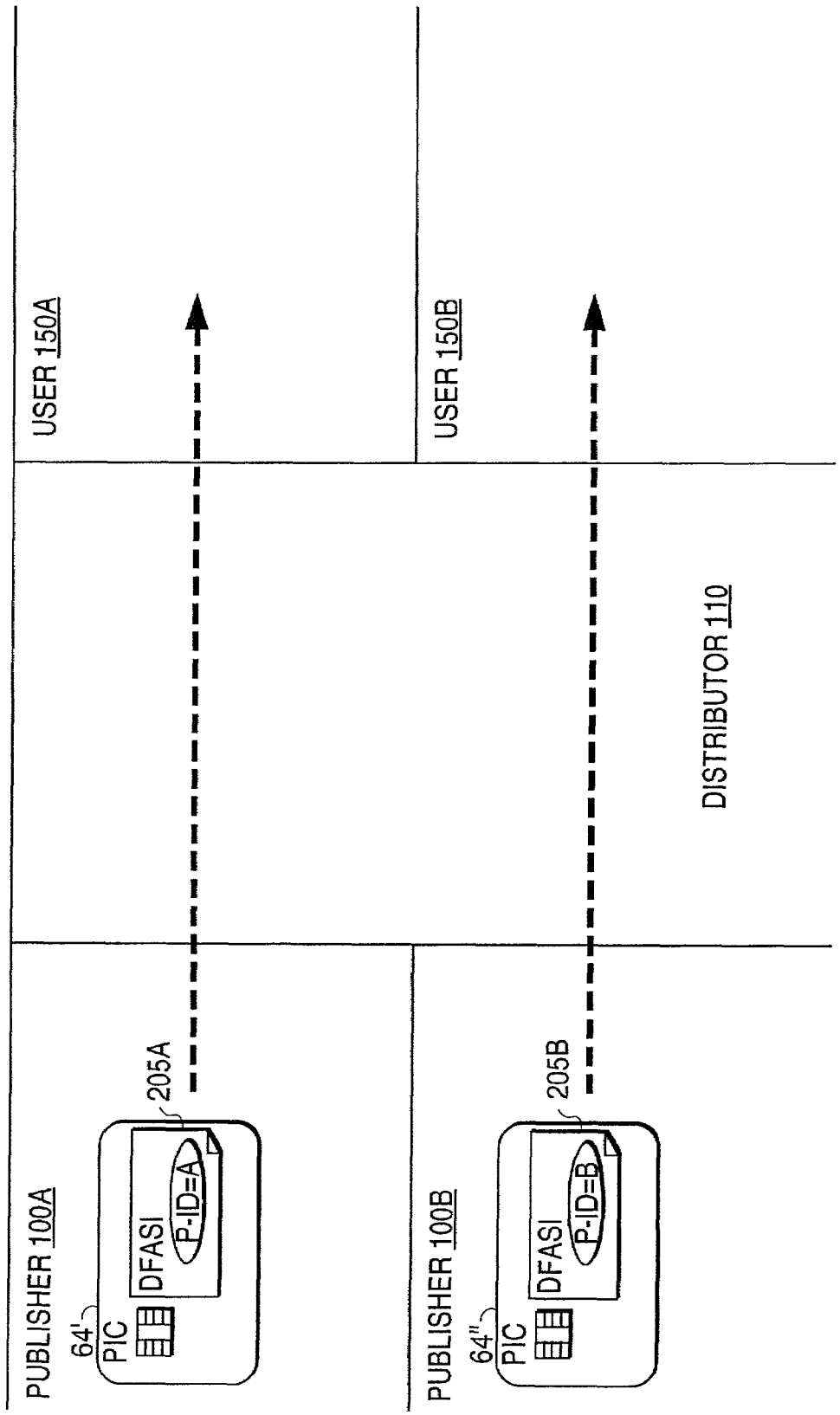
FIG. 10 illustrates an exemplary embodiment of distributing of indexes stored in IC cards in accordance with the present invention.

FIG. 10 illustrates an exemplary embodiment of distributing indexes which are stored on IC cards to users. Publishers 100A issues an IC card including a publisher identity (P-ID=A) stored on a data file access index 205A. The index (DFASI) 205A is stored on user IC card 64' which is issued by publisher 100A and provided to user 150A. An index DFASI 205B is stored on user IC card 64" which is issued by publisher 100B and provided to user 150B. Publishers may retail or provide the IC cards to users 150A and 150B via a distribution channel. Distributor 110 may be a retailer of the user cards which are issued by the publisher. The cards may also be distributed via a distribution channel digitally.

Figure 11:
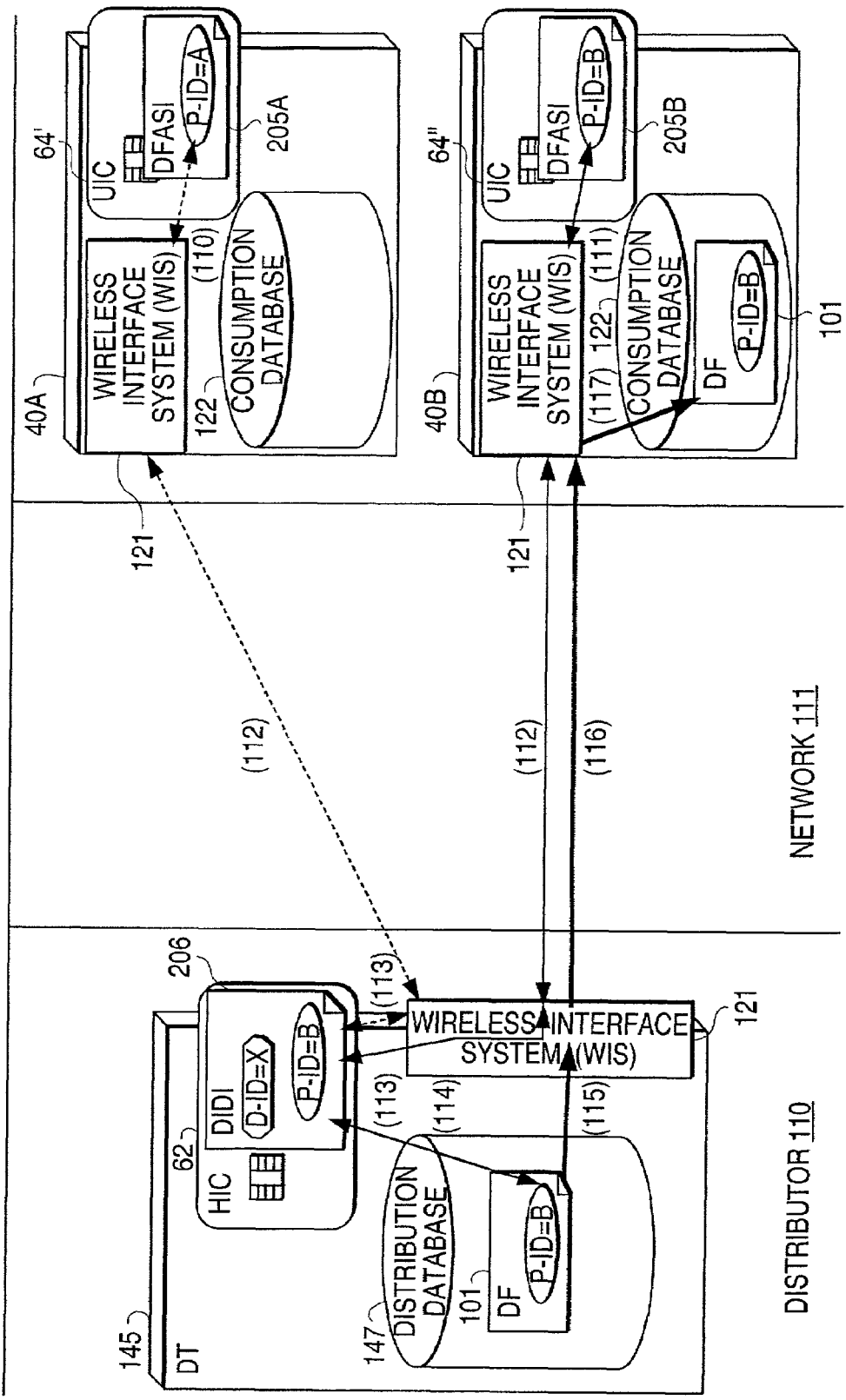
FIG. 11 illustrates an embodiment of non-centralized user access control in accordance with the present invention.

FIG. 11 illustrates an embodiment of non-centralized user access control. User 150A accesses the distribution terminal 145, such as a wireless kiosk, with a wireless terminal 40A and a user IC card 64'. Likewise, user 150B accesses the distribution terminal 145 with a wireless terminal 40B and a user IC card 64". User 150A or 150B inserts the user IC card 64' or 64" in the user terminal 40A or 40B. The user terminal 40A or 40B provides access to file access index (DFASI) 205A or 205B, and then obtains the respective publisher identity P-ID=A or P-ID=B from the IC card 64' or 64". The user terminal 40A or 40B sends the respective index PID=A or P-ID=B to the distribution terminal 145 through the interworking wireless interface module 1211 (Step 112). The distribution terminal 145 cross-checks the identity (P-ID) submitted from the user terminal 40A or 40B, comparing the received identity P-ID to the identity P-ID-A or P-ID=B which is stored on host IC card 62 in distributor identity index (DIDI) 206 (Step 113). If the identity P-ID=A or P-ID=B from the user terminal is verified as an authorized identity by the distribution terminal 145, then the distribution terminal 145 searches available data files 101 including the same identity P-ID=A or P-ID=B, indicating publisher A or B, in distribution database 147 (Step 114). If there are any relevant data files 101, the distribution terminal 145 delivers the data files 101 through wireless interface systems 121 to the requesting user terminal 40A or 40B (Steps 115, 116). The user terminal 40A or 40B may store the downloaded data files 101 into its database 122 (Step 117). The distribution terminals is enabled to count the result of successful delivery of data files, for example, multimedia files of the publisher, to users which have a user IC card including data file access index (DFASI) 205 which is issued by the relevant publisher.

Figure 12:
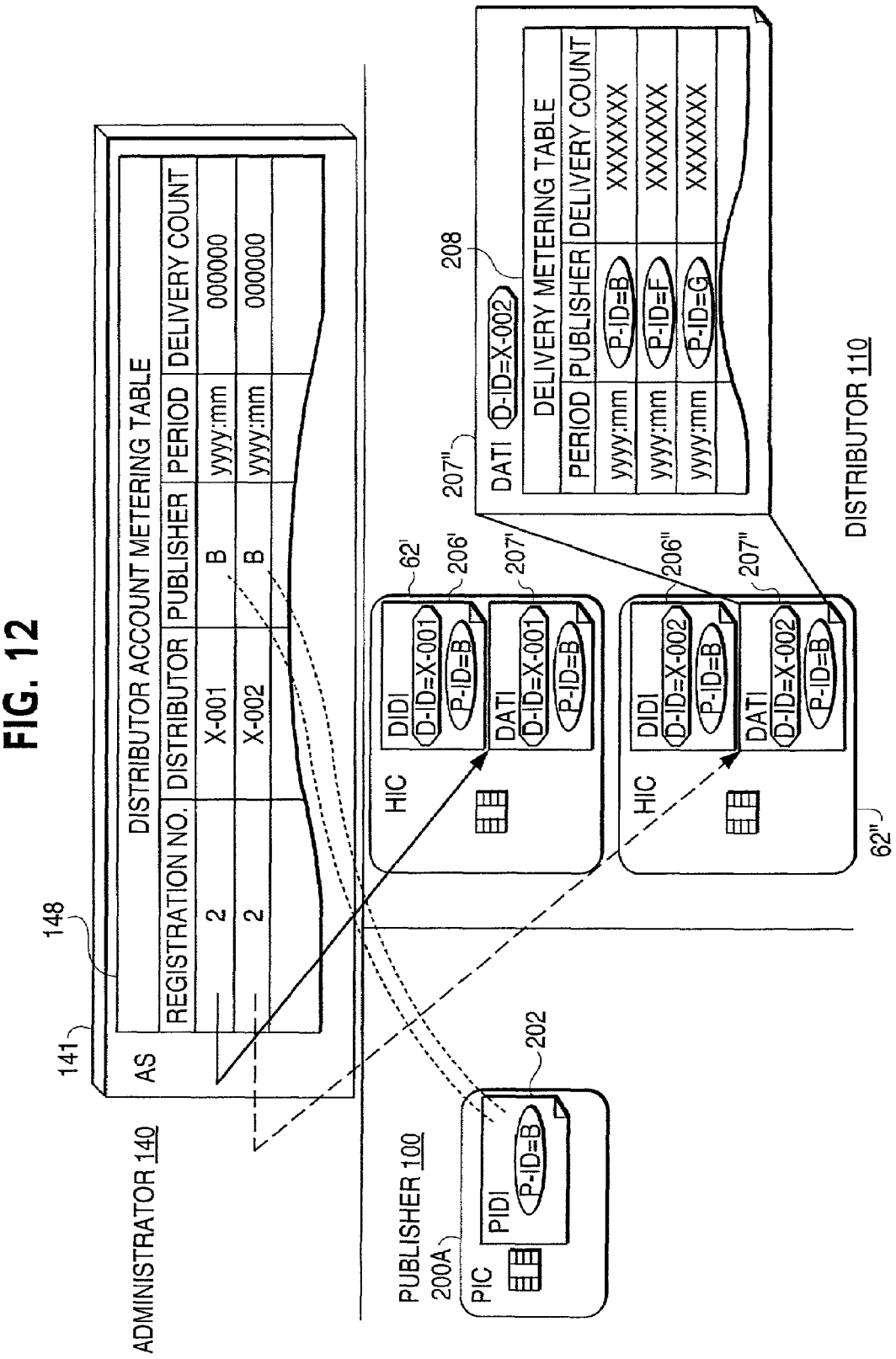
FIG. 12 illustrates an embodiment of registering of a distribution agreement of a data file in accordance with the present invention.

FIG. 12, illustrates an embodiment of registering of a distribution agreement for a data file. Publisher 100 and distributor 110 agree that distributor 110 may distribute data files which are published by publisher 100 on a non-usage metering basis, for example a flat charge based on the number of distribution terminals 145 that distributor 110 has. Another charge arrangement, such as a distribution charge according to usage, may be used. This enables a metering arrangement between publisher 100 and distributor 110 utilizing an IC card method. Administrator 140 includes administrator system 141. Administrator system 141 includes a distributor account metering table 148. Administrator 140 issues a host IC card 62" with a distributor account index (DATI) 207" including a delivery metering table 208. Distributor account metering table 148 in the administrator system 141 is synchronized according to the delivery metering table 208 in the index (DATI) 207". Distributor account metering table 148 includes the identity of publisher (B) according to the publisher identity index (PIDI) 202 which is stored on the publisher IC card 200A. The identity of the distributor is included in distributor account metering table 148 and may be retrieved from distributor identity index (DIDI) 206' (having the index D-ID=X-001) or 206" (having the index D-ID=X-002). The identity of the distributor is also in distributor account index 207' and 207". A delivery count field in delivery metering table 208 indicates the number of delivered data files. This number of delivered data files is sent to distributor account metering table 148 for, for example, billing purposes.

Figure 13:
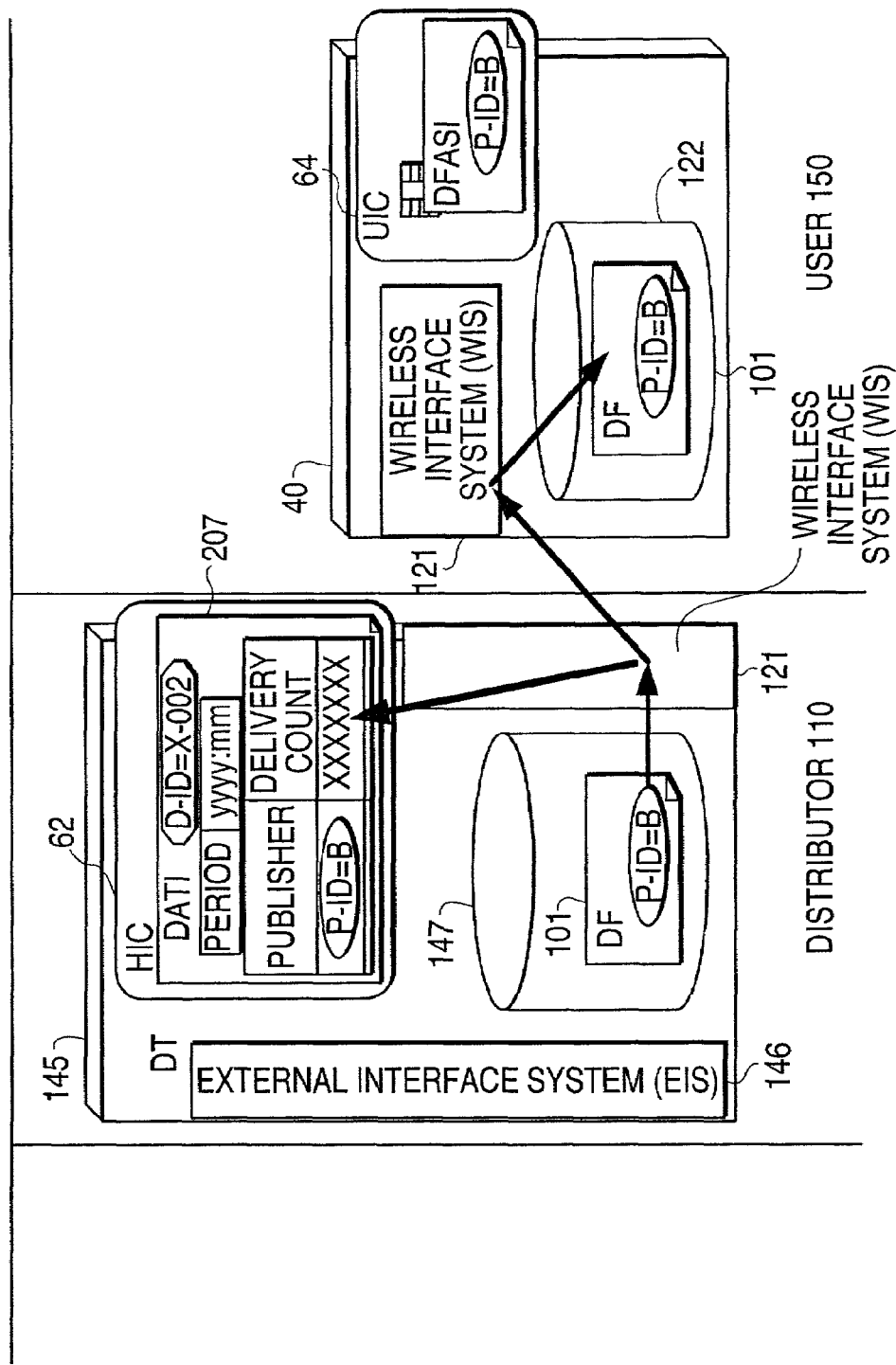
FIG. 13 illustrates an embodiment of metering of the delivery between second and third parties by use of an index in accordance with the present invention.

FIG. 13 illustrates an embodiment of metering the delivery between second and third parties. Distributor 110, such as the operator of the distribution terminal, inserts the host IC card 62, which includes distributor account index (DATI) 207, into distribution terminal 145. Data file 101, such as a multimedia file, is downloaded to the user terminal 40 that has the appropriate user IC card 64. When data file 101 is successfully downloaded to the database 122 of user terminal 40, the distribution terminal 145 receives an acknowledgment from the user terminal 40. After receiving of the acknowledgment, the distribution terminal 145 may send delivery count data to the distributor account index (DATI) 207 which is stored on host IC card 62. The delivery metering table 208 of the distributor account index (DATI) 207 accumulates the number of files of the relevant publisher (P-ID=B) that are successfully delivered.

Figure 14:
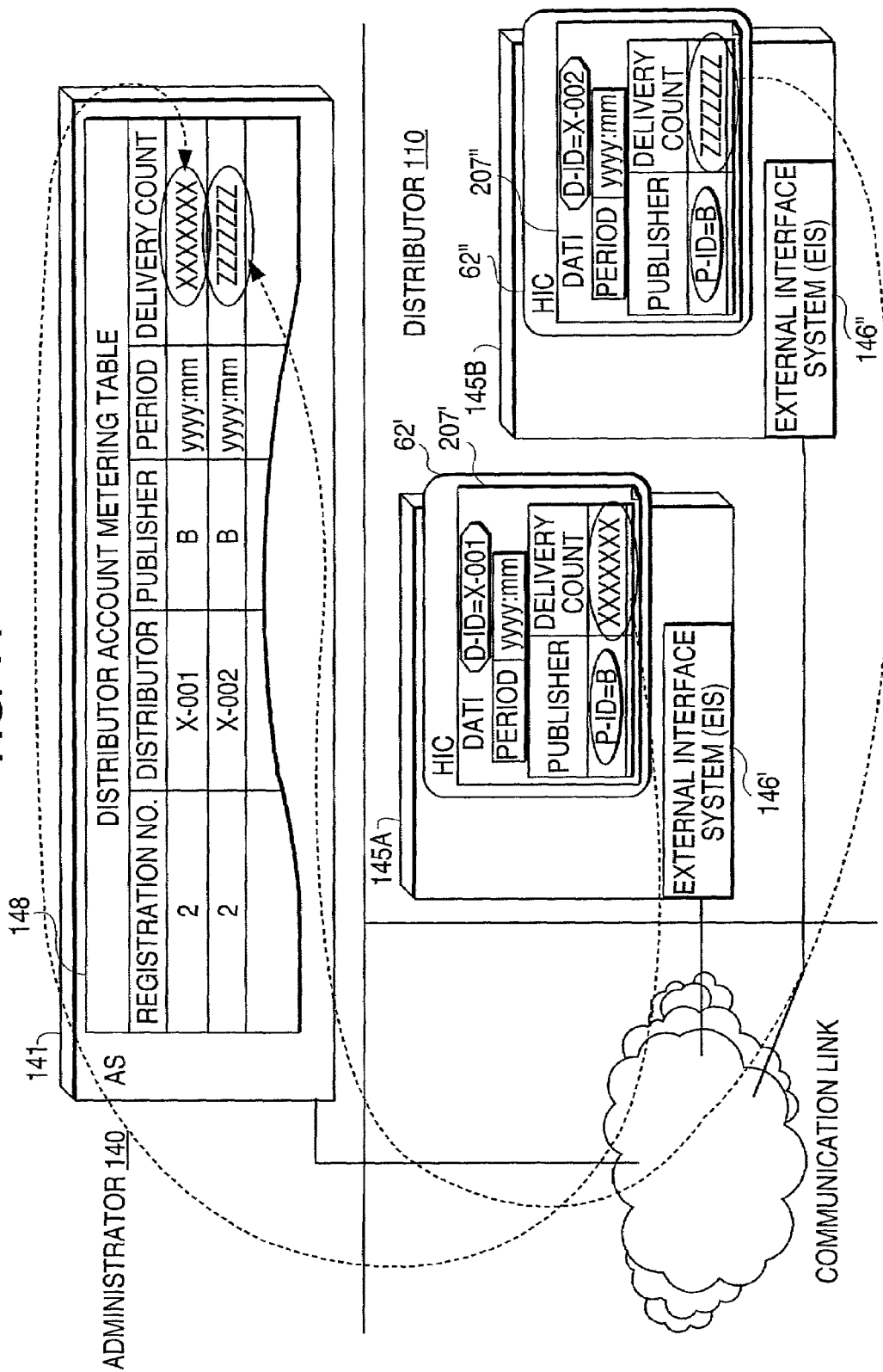
FIG. 14 illustrates an embodiment of metering of the delivery of data files between first and second parties by use of an index in accordance with the present invention.

FIG. 14 illustrates an embodiment of metering the distribution of data files between first and second parties. Utilizing the communication link between administrator system 141 and distributor terminal 145, administrator system 141 periodically monitors delivery metering table 208 which is stored on the host IC card 62', 62". The distributor terminal 145 uses external interface system (EIS) 146 to communicate with administrator system 141. Through this process, distributor account metering table 148 is updated. Administrator 140 delivers the delivery report for the period to publisher 100 and distributor 110 who register such metering agreement. Therefore, publisher 100 and distributor 110 determine the service charge based on their agreement. The distribution terminal 145 may also be implemented without a two-way networking capability, for example if the publisher-distributor agreement is a flat rate. The distributor terminal 145A has host IC card 62' which includes distributor account index (DATI) 207'. The index 207' has a delivery count "xxxxxxx" which is accordingly transferred to the register of the administrator system 141 for the distributor account metering table 148. The distributor terminal 145B has host IC card 62" which may include distributor account index (DATI) 207". The index 207" has a delivery count "zzzzzz" which is similarly transferred to the table 148.

Figure 15:
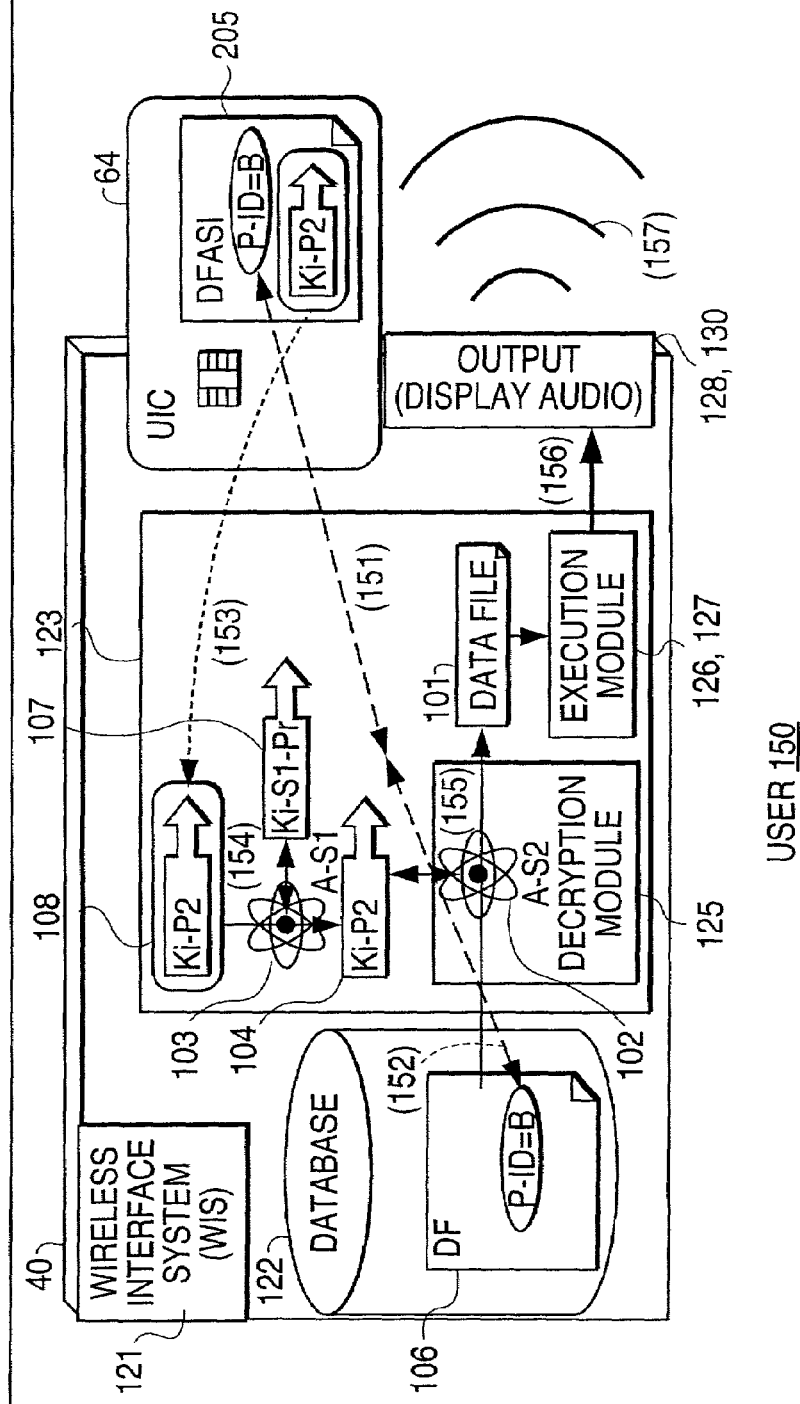
FIG. 15 depicts an embodiment of off-line data file execution in accordance with the present invention.

FIG. 15 illustrates an embodiment of off-line data file execution. User 150 has downloaded data files 101 such as multimedia files from the distribution terminal 145, for example from the wireless kiosk or the wireless multimedia distribution terminal, using the user terminal 40 and user IC card 64. After downloading data files 101, the user terminal 40 closes communication link 58 to the distribution terminal 145 and stays in an off-line mode. To execute or replay the downloaded data files 101, user 150 needs to insert the relevant IC card, for example user IC card 64, into the user terminal 40. When IC card 64 is inserted in user terminal 40, user terminal 40 may access the data file access index (DFASI) 205 and obtain the publisher identity (P-ID=B) (Step 151). The user terminal 40 searches the data files in the database 122 and picks up the data files having the same publisher identity (P-ID=B) as the one in the IC card 64 (Step 152). The user terminal 40 accesses the data file access index (DFASI) 205 and obtains the encrypted key (Ki-P2) 108 such as the data file decryption key (Step 153). Then the user terminal 40 decrypts the encrypted key (Ki-P2) 108 using the private key (Ki-S1-Pr) 107, the Private key for wireless multimedia terminal key exchange, and the algorithm A-S1 103, the algorithm for key exchange encryption (Step 154). The user terminal 40 decrypts the encrypted part of the data file using the key (Ki-P2) 104 and the algorithm (A-S2) 102 (Step 155). Then the user terminal 40 has the original data file 101. The user terminal 40 may execute or replay the original data file 101 now (Step 156). The user terminal 40 outputs primarily analog information such as audio and video for consumption by the user (Step 157).

Figure 16:
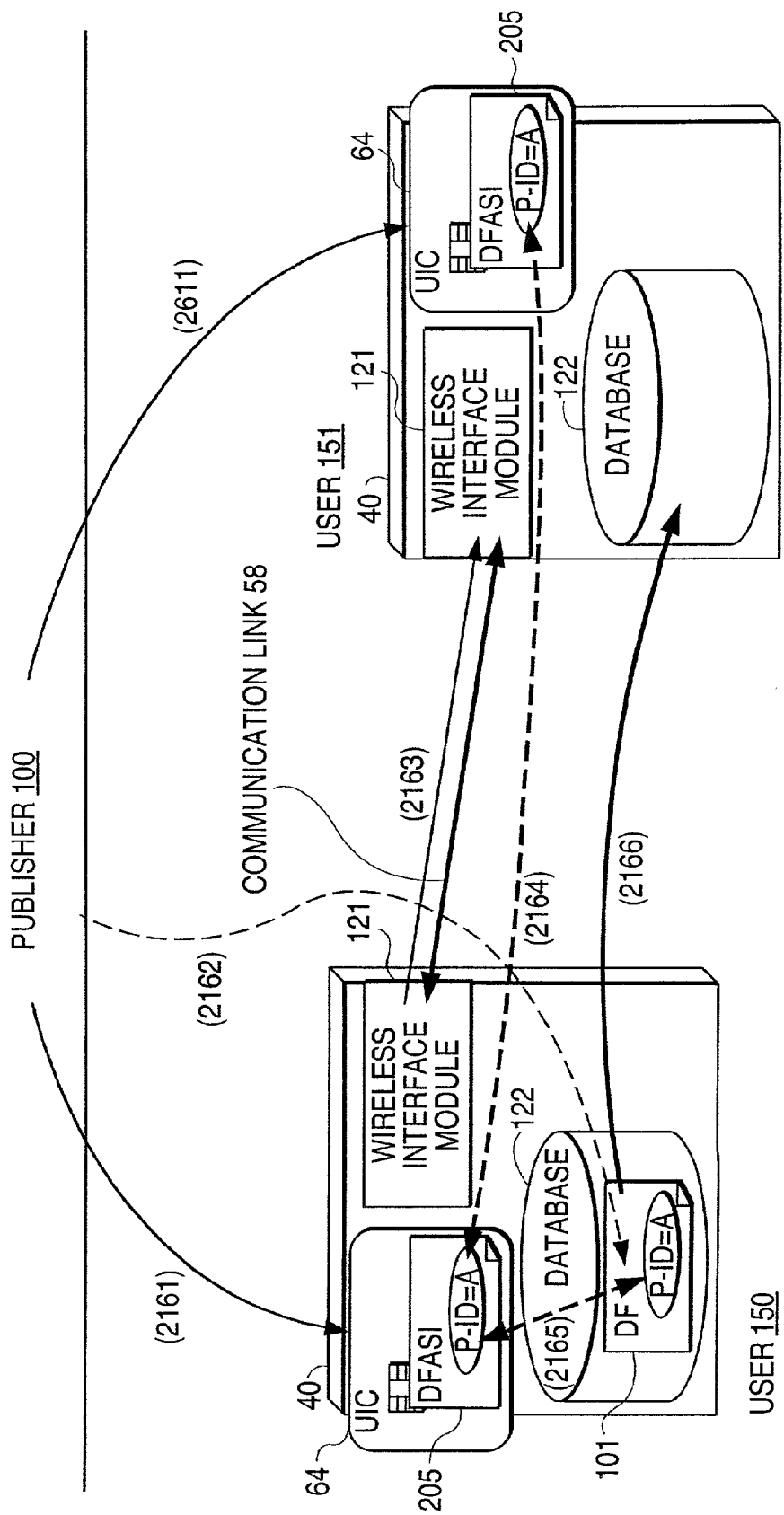
FIG. 16 depicts an embodiment of distribution of files between user terminals in accordance with the present invention.

FIG. 16, illustrates an embodiment of distribution of files between user terminals. Two users, both having a user terminal 40 and an IC card 64 issued by the same publisher 100, may transfer data files 101 as specified by user the IC cards 64. After the successful data file transfer, access to the data files 101 follows the same process as described in the example of FIG. 14. Both user 150 and user 151 have a user IC card 64 issued by publisher 100 and have a user terminal 40 (Step 2161). User 150 may already have relevant data files 101 which are published by the publisher 100 in user terminal 40 (Step 2162). Based on initiative by user terminal 40 of user 150, the sender side, the user terminals of user 150 and user 151 establish a communication link 58 (Step 2163). Communication link 58 may be in short-range radio communication link such as Bluetooth. The terminals communicate using wireless interface modules 121. The sender side user terminal (user 150) verifies the recipient side user terminal, then accesses the user IC card 64 that is inserted in the user terminal of the recipient side user 151. (Step 2164). The sender side user terminal crosschecks the publisher identity (P-ID=A) which is stored on user IC card 64 of the sender side and the recipient side. If both sender side and recipient side user terminals include a user IC card 64 having the same publisher identity (P-ID=A), the sender side user terminal forwards the data files 101 which are published by the publisher 100 (Step 2165). The sender side user terminal searches the database 122 for such data files. The sender side user terminal of user 150 forwards the selected data files 101 to the recipient side user terminal of user 151 (Step 2166). For the whole process of the data file forwarding, two user terminals 40 and two user IC cards 64 which are issued by the same publisher 100 are required. It is not be possible to forward data files from one user terminal to another, using only one user IC card 64 or using two user IC cards which have different publishers.

The publisher of the data file may implement a metering or charging method of his own. This may require a certification or indication of the administrator which may be stored on the user IC card. This may include the consumption account index (CATI). Using the index (CATI) the publisher may implement a metering and charging method of its own, for example a prepaid multimedia file download and replay service. The method may be able to do the charging again depending on the implementation.

Figure 17:
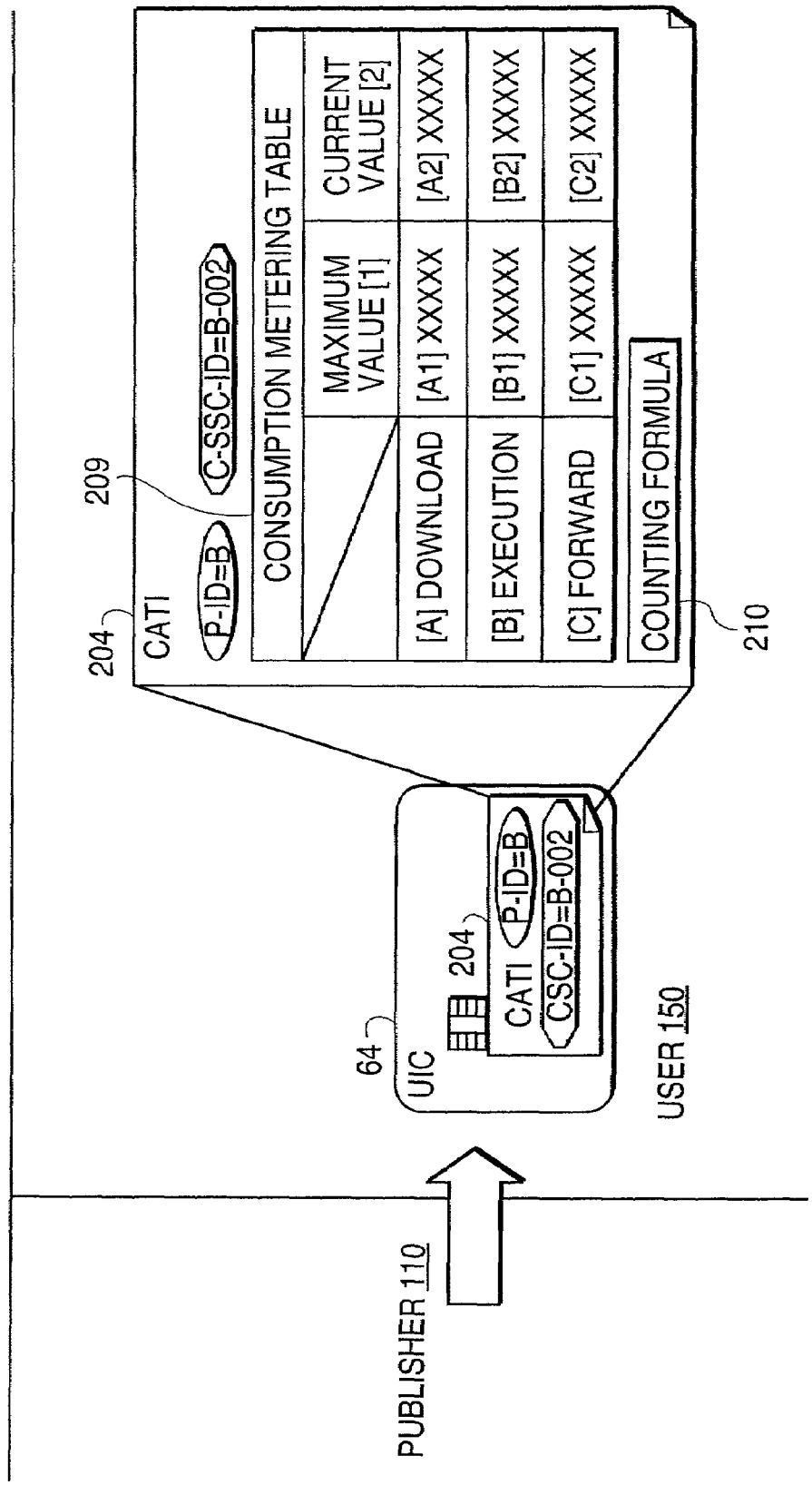
FIG. 17 illustrates an embodiment of non-centralized metering of consumer usage in accordance with the present invention.

FIG. 17 illustrates an embodiment of non-centralized metering of consumer usage is depicted. Consumption account index (CATI) 204 includes the publisher identity such as (P-ID=B), an identity of the user IC card such as CSC-ID=B-002, a consumption metering table 209, and a counting formula 210. Consumption metering table 209 sets a maximum value [1] and a current value [2] of data file 101 relating to download [A], execution [B] and forward [C]. The current value is incremented each time the IC card 64 is used to download, execute, or forward a file. User 150 utilizes the card 64 and functions delivered by the card 64 with the user terminal 40 up to the point that the current value reaches the maximum value that is set for each respective action. Alternatively, consumption metering table may contain only a maximum value which is incremented down each time IC card 64 is used to download, execute or forward a file, until the value reaches zero or so close thereto that there is insufficient value for another action. The consumption account index (CATI) 205 also includes counting formula 210 which specifies logic to calculate the relation of [A1], [A2], [B1], [B2], [C1] and [C2]. As an example, the publisher may set the formula so as to deduct the current value of multimedia file download [A2] when the customer forwards the relevant multimedia file to another party.

Figure 18:
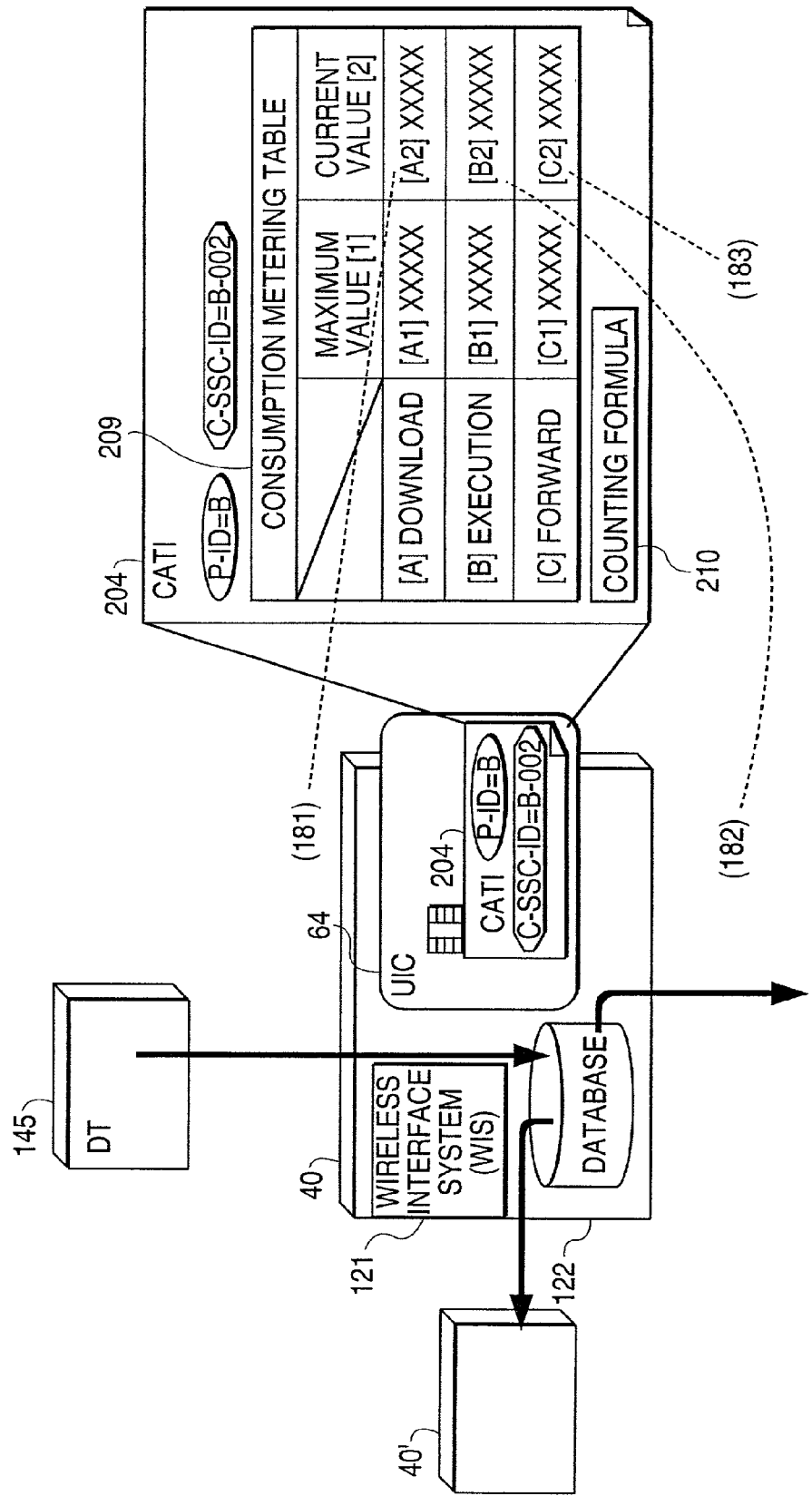
FIG. 18 illustrates an embodiment of metering of consumer usage in accordance with the present invention.

FIG. 18 illustrates an embodiment of metering of consumer usage. Publisher 100 implements various charging methods for the data file distribution using consumption account index (CATI) 205 which is stored on user IC card 64. As an example, a prepaid media card solution is illustrated. Publisher 100 sets a maximum value for the downloading of data files 101, for example, the number of times the customer may download data files 101. In the example, no maximum value for execution and forwarding of the files is set. When user 150 downloads data file 101 to the database 122, user IC card 64 and the wireless terminal 40 increase the current value which is stored on consumption metering table 209 in consumption account index (CATI) 204 (Step 181). If the current value exceeds the maximum value, the user cannot download contents further using the same card. When user 150 executes or replays the data file using user IC card 64, the current value for execution in consumption metering table 209 may be increased (Step 182). However, there is no maximum value in this case. User 150 may execute the file as many times as he likes. When user 150 forwards data file 101 to another user who has an another user IC card which is issued by the same publisher, the current value for downloading is deducted from the consumption metering table 209 (Step 183). Data file publishers may be enabled to set unique frameworks to manage and charge for distribution from the distribution terminal 145 to the user terminal 40 and from user terminal 40 to another user terminal 40'.

One aspect of the invention is to enable a publisher to distribute files to at least one consumer using distribution terminals. Data files such as multimedia files may include three steps in the flow. 1) Data file distribution from the publishing system of the publisher to a distribution terminal such as a wireless multimedia terminal of the distributor. 2) Data file download from the distribution terminal of the distributor to the wireless terminal of the user. 3) Data file execution by the wireless terminal of the user.

Figure 19:
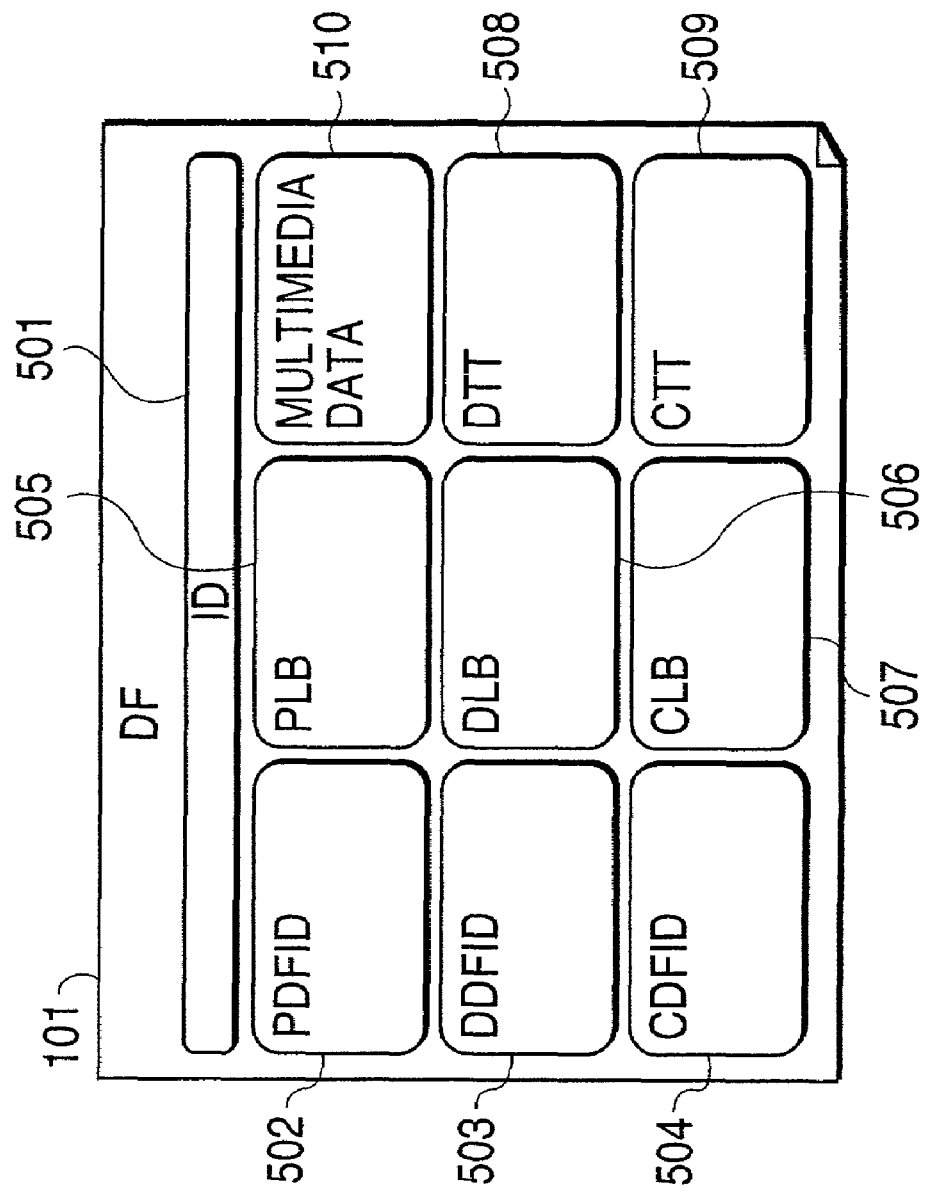
FIG. 19 is a block diagram of a system for indicating identification of data in accordance with an embodiment of the present invention.

FIG. 19 illustrates a block diagram of an embodiment of a data file. Data file (DF) 101 includes various indications which may be used to control and meter the file. Identifier (ID) 501 is unique and is programmed to be included in data files 101 by publisher 100. Identifier (ID) 501 is used to authenticate the data files 101 by the distribution terminal 145, such as wireless multimedia terminal for distribution, host IC card 62, the user terminal 40, and user IC card 64. Identifier (ID) 501 guarantees appropriate distribution and consumption of data files 101. Identifier (ID) 501 is used in the creation, distribution, downloading, and execution of the data file 101.

Publisher data file identifier (PDFID) 502 includes substantial elements, for example, publisher identity (P-ID), publisher country code, serial or unique number of the data file, serial or unique number of the key of the publisher for file encryption/decryption (Ki-P2) 104, date of publishing, and date of file disposal. Upon distribution from publisher 100 to distributor 110, the distribution terminal 145 and possibly publisher 100 use the publisher identity (P-ID) to select relevant data files to be downloaded and stored on the distribution terminal 145. This process is instructed by host IC card 62 that includes the same P-ID in distributor identity index (DIDI) 206. At the downloading from distributor 110 to user 150 and at the execution by user 150, the publisher identity (P-ID) and the serial or unique number of the key (Ki-P2) 104 are used to select the relevant data files from the respective database. The data file access index (DFASI) 205 in user IC card 64 includes the key (Ki-P2) 104 so as to download and execute relevant data files.

A distribution data file identifier (DDFID) 503 defines the distribution route of the data file specifying distributor identity (D-ID). It defines which publisher 100 has registered the distribution agreement. The identifier (DDFID) 503 includes multiple distributor identities (D-ID), if applicable. The data file is only distributed to and stored on the distribution terminal 145 when the distributor identity (D-ID), which is presented by a host IC card 62 that inserted into the terminal for distribution, matches the distributor identity (D-ID) specified by the identity (DDFID) 503. Publisher 100 may specify what data file is to be distributed to which distributors. Secondly, the identity (DDFID) 503 may define the geographical area or region to which the data file may be distributed. Another key element of the identity (DDFID) 503 is allowing distribution from user to user. This may be a flag to identify whether user to user distribution is approved or barred. If user to user distribution is flagged as approved, such data file can be forwarded from the user terminal 40 to the another user terminal of another user if both user terminals include a user IC card 64 which has the same publisher.

User IC card 64 includes the user profile index (UPI). The user of the card 64 sets his own profile to select and screen data files to be downloaded and to be executed. A consumption data file identifier (CDFID) 504 includes data file category information. The data file category information works with the user profile index (UPI) comprising, for example, the following:

security parameter—over 18 years old,
Language code—English
Content category codes—recreation
sports—football, baseball
music—classicical, jazz.

A publisher label (PLB) 505 includes, for example, publisher identity (P-ID), publisher name in text format, publisher logo and/or trademark in image or animation data format. The publisher name in text format is presented on the screen of user terminal 40 when user 150 selects the data file for downloading and executing. The publisher logo and/or trademark is presented on the screen of user terminal 40 when the data file is downloaded on the user terminal 40 and begins to execute.

A distribution label (DLB) 506 is an optional element in image or animation formats. Distribution label (DLB) 506 can be executed and presented on the screen of user terminal 40 when the data file 101 is downloaded and starts to execute. The basic concept of distribution label (DLB) 506 is to provide an opportunity for distributor 110 or the operator of the distribution terminal 145 to insert advertisement information so as to promote its own business and to facilitate more users to visit the premises. As an example, two ways to implement distribution label (DLB) 506 are illustrated: 1) Publisher 100 implements distribution label (DLB) 206 into a multimedia file upon agreement between publisher 100 and distributor 110. 2) Publisher 100 can keep the distribution label (DLB) 506 open so that distributor 110 can import its own label data, such as an advertisement, into the multimedia file at the distribution terminal 145. This may provide an additional feature to the distribution terminal 145.

A consumption label (CLB) 507 identifies the data file 101 for the user, for example through a display on the user terminal 40. Consumption label (CLB) 507 includes a serial or unique number of the data file 101, title of the data file in text format, and an icon or logo of the data file trademark in image or animation data format. The title and icon/logo of the data file 101 are presented on the screen of the user terminal 40 when user 150 selects the data file 101 for downloading and execution.

A distribution tariff tag (DTT) 508 works with distribution account index (DATI) 207 in user IC card 64. Publisher 100 sets the value of the data file 101 for distribution using distribution tariff tag (DTT) 508. When user 150 downloads the data file 101 from the distribution terminal 145 to the user terminal 40, the distribution terminal 145 increases the table in the distribution account index (DATI) 207 according to the information specified by distribution tariff tag (DTT) 508. In short, distribution tariff tag (DTT) 508 specifies the amount of incentive that publisher 100 pays distributor 110 when distributor 110 delivers the data file 101 to user 150.

A consumption tariff tag (CTT) 509 works with consumption account index (CATI) 204 in user IC card 64. Publisher 100 sets a value of the data file 101 for downloading and consumption using consumption tariff tag (CTT) 509. When user 150 downloads the data file 101 from the distribution terminal 145 to user terminal 40, the distribution terminal 145 increases the table in the consumption account index (CATI) 204 according to the information specified by consumption tariff tag (DTT) 509. In short, consumption tariff tag (CTT) 509 specifies the price for the user to 1) download the data file 101 and 2) execute the data file 101. The usage value is added in the current value table in consumption account index (CATI) 204 or deducted from a prepaid value.

Multimedia data 510 is the core object of data file 101. Multimedia data 510, such as bits, is to be executed by the user terminal 40 such as wireless multimedia terminal, for consumption by user 150. This part of the data file can be encrypted.

Further in one particular embodiment of the invention, the decryption key (first key) of the content includes wireless terminal access to the distributor, such as a kiosk, content download from the distributor, and content decryption in a wireless terminal utilizing the information in the IC card which is also transferred to the terminal. For example, the IC card may be downloaded to a wireless terminal via a communication link.

FIG. 20 is a flow chart of a method of receiving and displaying data in accordance with the present invention, and FIG. 21 is a flow chart of a method of selecting, distributing and decrypting a file in accordance with the invention. These flow charts set forth suitable methods for the above described procedures.

While the preferred embodiments of the invention have been described, those skilled in the art will recognize that other and further changes and modifications may be made thereto without departing from the spirit of the invention.

What is claimed is:

1. A method comprising:
   encrypting a first encryption key using a second encryption key, to provide an encrypted first encryption key;
   storing the encrypted first encryption key on a first integrated circuit card at a first computer;
   encrypting a data file using the first encryption key, to result in an encrypted data file;
   distributing the encrypted data file to a distribution terminal;
   placing the first integrated circuit card into communication with a first mobile terminal;
   downloading the encrypted data file from the distribution terminal to the first mobile terminal and storing the encrypted data file on the first mobile terminal;
   directly transferring the encrypted first encryption key from the first integrated circuit card to the first mobile terminal, wherein the encrypted first encryption key and the encrypted data file are transmitted over separate communication channels;
   decrypting the encrypted first encryption key in the first mobile terminal using an encryption key corresponding to the second encryption key; and
   decrypting the encrypted data file in the first mobile terminal using the first encryption key.

2. The method of claim 1, further comprising wirelessly transferring the encrypted data file to the first mobile terminal.

3. The method of claim 1, wherein the first integrated circuit card includes a publisher identity stored thereon, and wherein downloading the encrypted data file includes:
   sending the publisher identity to the distribution terminal, and
   verifying the sent publisher identity as an authorized identity.

4. The method of claim 1, further comprising:
   transferring the data file from the first mobile terminal to a second mobile terminal.

5. The method of claim 1, further comprising:
   establishing a communication link between the first mobile terminal and a second mobile terminal;
   accessing, by the first mobile terminal, a second integrated circuit card in communication with the second mobile terminal;
   determining that the first and second integrated circuit cards each have a common publisher identity stored thereon; and
   forwarding, based on the determination of common publisher identity stored on the first and second integrated circuit cards, the data file from the first mobile terminal to the second mobile terminal.

6. The method of claim 1, wherein the first integrated circuit card includes consumption metering data stored thereon, and further comprising:
   updating the consumption metering data based on download of the data file to the first mobile terminal;
   updating the consumption metering data based on download of additional data files to the first mobile terminal; and
   upon the consumption metering data reaching a predetermined value, allowing no further data file downloads based on the consumption metering data reaching the predetermined value.

7. The method of claim 6, further comprising:
   updating the consumption metering data upon transfer of the data file or one of the additional data files to a second mobile terminal.

8. The method of claim 7, wherein the updating process permits downloading of further data files by the first mobile terminal from the distribution terminal.

9. The method of claim 1, wherein the second encryption key is one of the encryption keys of a public/private encryption key pair, and wherein the key corresponding to the second encryption key is the other of the encryption keys of the public/private encryption key pair.

10. The method of claim 9, wherein:
    the other of the encryption keys of the public/private encryption key pair is stored in a secure module in the first mobile terminal.

11. A system comprising:
    a first integrated circuit card;
    a first computer configured to store an encrypted first encryption key on the first integrated circuit card, the encrypted first encryption key including a first encryption key encrypted using a second encryption key;
    a distribution terminal configured to receive an encrypted data file, wherein the encrypted data file is data file encrypted using the first encryption key; and
    a first mobile terminal configured to
       communicate with the first integrated circuit card,
       download the encrypted data file from the distribution terminal,
       store the encrypted data file,
       directly receive the encrypted first encryption key from the first integrated circuit card, wherein the encrypted first encryption key and the encrypted data file are transmitted over separate communication channels,
       decrypt the encrypted first encryption key using an encryption key corresponding to the second encryption key, and
       decrypt the encrypted data file using the first encryption key.

12. The system of claim 11, wherein the first integrated circuit card includes a publisher identity stored thereon, and wherein
    the first mobile terminal is configured to send the publisher identity to the distribution terminal, and
    the distribution terminal is configured to verify the sent publisher identity as an authorized identity.

13. The system of claim 11, further comprising a second mobile terminal, and wherein the first mobile terminal is configured to transfer the data file to the second mobile terminal.

14. The system of claim 11, further comprising a second mobile terminal, and wherein the first mobile terminal is configured to:
    establish a communication link with the second mobile terminal,
    access a second integrated circuit card in communication with the second mobile terminal,
    determine that the first and second integrated circuit cards each store a common publisher identity, and
    forward, based on the determination that the first and second integrated circuit cards each store a common publisher identity, the data file to the second mobile terminal.

15. The system of claim 11, wherein the second encryption key is one of the encryption keys of a public/private encryption key pair, and wherein the key corresponding to the second encryption key is the other of the encryption keys of the public/private encryption key pair.

16. The system of claim 15, wherein:
the other of the encryption keys of the public/private encryption key pair is stored in a secure module in the first mobile terminal.

17. A method comprising:
establishing communication between an encryption source and a first mobile terminal;
downloading an encrypted data file from a distribution source to the first mobile terminal and storing the encrypted data file on the first mobile terminal;
directly receiving an encrypted first encryption key from the encryption source at the first mobile terminal, wherein the encrypted first encryption key and the encrypted data file are received into the first mobile terminal via separate communication channels;
decrypting the encrypted first encryption key to obtain a first encryption key in the first mobile terminal using a second encryption key; and
decrypting the encrypted data file to obtain a data file in the first mobile terminal using the first encryption key.

18. The method of claim 17, wherein downloading the encrypted data file comprises wirelessly receiving the encrypted data file.

19. The method of claim 17, wherein the encryption source includes a publisher identity stored thereon, and wherein downloading the encrypted data file includes:
sending the publisher identity to the distribution source; and
verifying the sent publisher identity as an authorized identity.

20. The method of claim 17, further comprising:
transferring the data file from the first mobile terminal to a second mobile terminal.

21. The method of claim 17, further comprising:
establishing a communication link between the first mobile terminal and a second mobile terminal;
accessing, by the first mobile terminal, a second encryption source in communication with the second mobile terminal;
determining that the first and second encryption sources each have a common publisher identity stored thereon; and
forwarding, based on the determination of common publisher identity stored on the first and second encryption sources, the data file from the first mobile terminal to the second mobile terminal.

22. The method of claim 17, wherein the first encryption source includes consumption metering data stored thereon, and further comprising:
updating the consumption metering data based on download of the data file to the first mobile terminal;
updating the consumption metering data based on download of additional data files to the first mobile terminal; and
upon the consumption metering data reaching a predetermined value, allowing no further data file downloads based on the consumption metering data reaching the predetermined value.

23. The method of claim 22, further comprising:
updating the consumption metering data upon transfer of the data file or one of the additional data files to a second mobile terminal.

24. The method of claim 23, wherein the updating the consumption metering data upon transfer of the data file or one of the additional data files to the second mobile terminal permits downloading of further data files by the first mobile terminal from the distribution source.

25. The method of claim 17, wherein the second encryption key is one of the encryption keys of a public/private encryption key pair, and wherein the key corresponding to the second encryption key is the other of the encryption keys of the public/private encryption key pair.

26. The method of claim 17, further comprising:
storing the encrypted first encryption key on a first integrated circuit card at a first computer.

27. The method of claim 17, further comprising:
distributing the encrypted data file to a distribution terminal.

28. Apparatus comprising:
a memory; and
a processor configured to perform a method comprising:
establishing communication between an encryption source and the apparatus;
downloading an encrypted data file from a distribution source to the apparatus and storing the encrypted data file on the apparatus;
directly receiving an encrypted first encryption key from the encryption source at the apparatus, wherein the encrypted first encryption key and the encrypted data file are received into the apparatus via separate communication channels;
decrypting the encrypted first encryption key to obtain a first encryption key in the apparatus using a second encryption key; and
decrypting the encrypted data file to obtain a data file in the apparatus using the first encryption key.

29. The apparatus of claim 28, wherein the data file comprises a multimedia file.

30. The apparatus of claim 28 wherein the apparatus comprises a wireless terminal for multimedia data.

31. The apparatus of claim 28, wherein the distribution source comprises a wireless kiosk.

32. The apparatus of claim 28, wherein said downloading to the apparatus the encrypted data file from the distribution source comprises wirelessly receiving the encrypted data file at the apparatus.

33. The apparatus of claim 28, wherein the encryption source includes a publisher identity stored thereon, and wherein the downloading an encrypted data file from the distribution source further includes:
sending the publisher identity to the distribution source, to verify the sent publisher identity as an authorized identity.

34. The apparatus of claim 28, wherein the processor is further configured to perform:
transferring the data file from the apparatus to a second apparatus.

35. The apparatus of claim 28, wherein the processor is further configured to perform:
establishing a communication link between the apparatus and a second apparatus;
accessing a second encryption source in communication with the second apparatus;
determining that the first and second encryption sources each have a common publisher identity stored thereon; and
based on the determination, forwarding the data file to the second apparatus.

* * * * *